(12) United States Patent
Crivat et al.

(10) Patent No.: US 10,474,974 B2
(45) Date of Patent: Nov. 12, 2019

(54) RECIPROCAL MODELS FOR RESOURCE ALLOCATION

(71) Applicant: Apptio, Inc., Bellevue, WA (US)

(72) Inventors: Ioan Bogdan Crivat, Woodinville, WA (US); Mikalai Panasiuk, Bellevue, WA (US); Israel Hilerio, Bellevue, WA (US)

(73) Assignee: Apptio, Inc., Bellevue, WA (US)

( * ) Notice: Subject to any disclaimer, the term of this patent is extended or adjusted under 35 U.S.C. 154(b) by 0 days.

(21) Appl. No.: 15/260,221

(22) Filed: Sep. 8, 2016

(65) Prior Publication Data

US 2018/0068246 A1    Mar. 8, 2018

(51) Int. Cl.
*G06Q 10/06* (2012.01)

(52) U.S. Cl.
CPC .................. *G06Q 10/06313* (2013.01)

(58) Field of Classification Search
CPC ................................. G06Q 10/06313
See application file for complete search history.

(56) References Cited

U.S. PATENT DOCUMENTS

| | | | |
|---|---|---|---|
| 4,744,026 A | 5/1988 | Vanderbei | |
| 5,249,120 A | 9/1993 | Foley | |
| 5,615,121 A | 3/1997 | Babayev et al. | |
| 5,619,211 A | 4/1997 | Horkin et al. | |
| 5,721,919 A | 2/1998 | Morel et al. | |
| 5,758,327 A | 5/1998 | Gardner et al. | |
| 5,799,286 A | 8/1998 | Morgan et al. | |
| 5,802,508 A | 9/1998 | Morgenstern | |
| 5,903,453 A | 5/1999 | Stoddard, II | |
| 5,970,476 A | 10/1999 | Fahey | |
| 5,991,741 A | 11/1999 | Speakman et al. | |
| 6,014,640 A | 1/2000 | Bent | |

(Continued)

FOREIGN PATENT DOCUMENTS

JP    2011134268 A    7/2011

OTHER PUBLICATIONS

Official Communication for U.S. Appl. No. 14/867,552 dated Oct. 3, 2016, 19 pages.

(Continued)

*Primary Examiner* — Sujay Koneru
*Assistant Examiner* — Mohamed N El-Bathy
(74) *Attorney, Agent, or Firm* — John W. Branch; Lowe Graham Jones PLLC

(57) ABSTRACT

Embodiments are directed to managing data models for managing resource allocation. A data model portion may be provided. Allocation information based on resource allocations associated with pass-through objects that may be included in the data model portion. A memory buffer may be configured to include allocation ratio information and fixed resource value information. A reciprocal model based on the memory buffer and the data model portion may be provided. Providing the reciprocal model may include providing an effective resource value engine based on solving a linear system corresponding to the allocation ratio information and the fixed resource value information. If resource information for a pass-through object associated with the reciprocal model may be requested, the reciprocal model may be employed to provide the resource information to the data model.

26 Claims, 17 Drawing Sheets

(56) References Cited

U.S. PATENT DOCUMENTS

| | | | |
|---|---|---|---|
| 6,032,123 A | 2/2000 | Jameson | |
| 6,047,290 A | 4/2000 | Kennedy et al. | |
| 6,208,993 B1 | 3/2001 | Shadmon | |
| 6,249,769 B1 | 6/2001 | Ruffin et al. | |
| 6,253,192 B1 | 6/2001 | Corlett et al. | |
| 6,308,166 B1 | 10/2001 | Breuker et al. | |
| 6,321,207 B1 | 11/2001 | Ye | |
| 6,330,552 B1 | 12/2001 | Farrar et al. | |
| 6,424,969 B1 | 7/2002 | Gruenwald | |
| 6,507,825 B2 | 1/2003 | Suh | |
| 6,578,005 B1 | 6/2003 | Lesaint et al. | |
| 6,594,672 B1 | 7/2003 | Lampson et al. | |
| 6,647,370 B1 | 11/2003 | Fu et al. | |
| 6,738,736 B1 | 5/2004 | Bond | |
| 6,789,252 B1 | 9/2004 | Burke et al. | |
| 6,832,212 B1 | 12/2004 | Zenner et al. | |
| 6,839,719 B2 | 1/2005 | Wallace | |
| 6,877,034 B1 | 4/2005 | Machin et al. | |
| 6,882,630 B1 | 4/2005 | Seaman | |
| 6,965,867 B1 * | 11/2005 | Jameson | G06Q 10/06 705/7.12 |
| 6,983,321 B2 | 1/2006 | Trinon et al. | |
| 7,050,997 B1 | 5/2006 | Wood, Jr. | |
| 7,130,822 B1 | 10/2006 | Their et al. | |
| 7,149,700 B1 | 12/2006 | Munoz et al. | |
| 7,177,850 B2 | 2/2007 | Argenton et al. | |
| 7,263,527 B1 | 8/2007 | Malcolm | |
| 7,305,491 B2 | 12/2007 | Miller et al. | |
| 7,308,427 B1 | 12/2007 | Hood | |
| 7,321,869 B1 | 1/2008 | Phibbs, Jr. | |
| 7,386,535 B1 | 6/2008 | Kalucha et al. | |
| 7,418,438 B2 | 8/2008 | Gould et al. | |
| 7,505,888 B2 | 3/2009 | Legault et al. | |
| 7,590,937 B2 | 9/2009 | Jacobus et al. | |
| 7,634,431 B2 | 12/2009 | Stratton | |
| 7,653,449 B2 | 1/2010 | Hunter et al. | |
| 7,664,729 B2 | 2/2010 | Klein et al. | |
| 7,703,003 B2 | 4/2010 | Payne et al. | |
| 7,725,343 B2 | 5/2010 | Johanson et al. | |
| 7,742,961 B2 | 6/2010 | Aaron et al. | |
| 7,752,077 B2 | 7/2010 | Holden et al. | |
| 7,769,654 B1 | 8/2010 | Hurewitz | |
| 7,774,458 B2 | 8/2010 | Trinon et al. | |
| 7,783,759 B2 | 8/2010 | Eilam et al. | |
| 7,801,755 B2 | 9/2010 | Doherty et al. | |
| 7,805,400 B2 | 9/2010 | Teh et al. | |
| 7,813,948 B2 | 10/2010 | Ratzloff | |
| 7,852,711 B1 | 12/2010 | Fitzgerald et al. | |
| 7,870,051 B1 | 1/2011 | En et al. | |
| 7,877,742 B2 | 1/2011 | Duale et al. | |
| 7,899,235 B1 | 3/2011 | Williams et al. | |
| 7,917,555 B2 | 3/2011 | Gottumukkala et al. | |
| 7,930,396 B2 | 4/2011 | Trinon et al. | |
| 7,933,861 B2 | 4/2011 | Zadorozhny | |
| 7,945,489 B2 | 5/2011 | Weiss et al. | |
| 7,966,235 B1 | 6/2011 | Capelli et al. | |
| 8,010,584 B1 | 8/2011 | Craver et al. | |
| 8,024,241 B2 | 9/2011 | Bailey et al. | |
| 8,073,724 B2 | 12/2011 | Harthcryde et al. | |
| 8,175,863 B1 | 5/2012 | Ostermeyer et al. | |
| 8,195,524 B2 | 6/2012 | Sandholm et al. | |
| 8,200,518 B2 | 6/2012 | Bailey et al. | |
| 8,200,561 B1 | 6/2012 | Scott et al. | |
| 8,209,218 B1 | 6/2012 | Basu et al. | |
| 8,260,959 B2 | 9/2012 | Rudkin et al. | |
| 8,370,243 B1 | 2/2013 | Cernyar | |
| 8,396,775 B1 | 3/2013 | Mindlin | |
| 8,423,428 B2 | 4/2013 | Grendel et al. | |
| 8,484,355 B1 | 7/2013 | Lochhead et al. | |
| 8,533,904 B2 | 9/2013 | Conrad | |
| 8,543,438 B1 | 9/2013 | Fleiss | |
| 8,600,830 B2 | 12/2013 | Hoffberg | |
| 8,601,263 B1 | 12/2013 | Shankar et al. | |
| 8,655,714 B2 | 2/2014 | Weir et al. | |
| 8,667,385 B1 | 3/2014 | Mui et al. | |
| 8,768,976 B2 | 7/2014 | McLachlan et al. | |
| 8,826,230 B1 | 8/2014 | Michelsen | |
| 8,935,301 B2 | 1/2015 | Chmiel et al. | |
| 8,937,618 B2 | 1/2015 | Erez et al. | |
| 8,970,476 B2 | 3/2015 | Chan | |
| 8,996,552 B2 | 3/2015 | Munkes et al. | |
| 9,015,692 B1 | 4/2015 | Clavel | |
| 9,020,830 B2 | 4/2015 | Purpus et al. | |
| 9,104,661 B1 * | 8/2015 | Evans | G06F 17/28 |
| 9,213,573 B2 | 12/2015 | French et al. | |
| 9,281,012 B2 | 3/2016 | Hedges | |
| 9,384,511 B1 | 7/2016 | Purpus | |
| 9,529,863 B1 | 12/2016 | Gindin et al. | |
| 9,805,311 B1 | 10/2017 | Mohler | |
| 10,152,722 B2 | 12/2018 | Heath | |
| 2002/0002557 A1 | 1/2002 | Straube et al. | |
| 2002/0016752 A1 | 2/2002 | Suh | |
| 2002/0056004 A1 | 5/2002 | Smith | |
| 2002/0069102 A1 | 6/2002 | Vellante et al. | |
| 2002/0082966 A1 | 6/2002 | O'Brien et al. | |
| 2002/0087441 A1 | 7/2002 | Wagner, Jr. et al. | |
| 2002/0107914 A1 | 8/2002 | Charisius et al. | |
| 2002/0123945 A1 | 9/2002 | Booth et al. | |
| 2002/0145040 A1 | 10/2002 | Grabski | |
| 2002/0156710 A1 | 10/2002 | Ryder | |
| 2002/0174006 A1 | 11/2002 | Rugge et al. | |
| 2002/0178198 A1 | 11/2002 | Steele | |
| 2002/0194329 A1 | 12/2002 | Alling | |
| 2003/0019350 A1 | 1/2003 | Khosla | |
| 2003/0074269 A1 | 4/2003 | Viswanath | |
| 2003/0083388 A1 | 5/2003 | L'Alloret | |
| 2003/0083888 A1 | 5/2003 | Argenton et al. | |
| 2003/0083912 A1 | 5/2003 | Covington et al. | |
| 2003/0093310 A1 | 5/2003 | Macrae | |
| 2003/0110113 A1 | 6/2003 | Martin | |
| 2003/0139960 A1 | 7/2003 | Nishikawa et al. | |
| 2003/0139986 A1 | 7/2003 | Roberts, Jr. | |
| 2003/0158724 A1 | 8/2003 | Uchida | |
| 2003/0158766 A1 | 8/2003 | Mital et al. | |
| 2003/0172018 A1 | 9/2003 | Chen et al. | |
| 2003/0172368 A1 | 9/2003 | Alumbaugh et al. | |
| 2003/0195780 A1 | 10/2003 | Arora et al. | |
| 2003/0208493 A1 | 11/2003 | Hall et al. | |
| 2003/0217033 A1 | 11/2003 | Sandler et al. | |
| 2003/0233301 A1 | 12/2003 | Chen et al. | |
| 2003/0236721 A1 | 12/2003 | Plumer et al. | |
| 2004/0030628 A1 | 2/2004 | Takamoto et al. | |
| 2004/0039685 A1 | 2/2004 | Hambrecht et al. | |
| 2004/0059611 A1 | 3/2004 | Kananghinis et al. | |
| 2004/0059679 A1 | 3/2004 | Mizumachi et al. | |
| 2004/0073477 A1 | 4/2004 | Heyns et al. | |
| 2004/0093344 A1 | 5/2004 | Berger et al. | |
| 2004/0111509 A1 | 6/2004 | Eilam et al. | |
| 2004/0133676 A1 | 7/2004 | Sproule | |
| 2004/0138942 A1 | 7/2004 | Pearson et al. | |
| 2004/0186762 A1 | 9/2004 | Beaven et al. | |
| 2004/0243438 A1 | 12/2004 | Mintz | |
| 2004/0249737 A1 | 12/2004 | Tofte | |
| 2005/0004856 A1 | 1/2005 | Brose et al. | |
| 2005/0033631 A1 | 2/2005 | Wefers et al. | |
| 2005/0038788 A1 | 2/2005 | Dettinger et al. | |
| 2005/0044224 A1 | 2/2005 | Jun et al. | |
| 2005/0060298 A1 | 3/2005 | Agapi et al. | |
| 2005/0060317 A1 | 3/2005 | Lott et al. | |
| 2005/0071285 A1 | 3/2005 | Laicher et al. | |
| 2005/0091102 A1 | 4/2005 | Retsina | |
| 2005/0120032 A1 | 6/2005 | Liebich et al. | |
| 2005/0144110 A1 | 6/2005 | Chen et al. | |
| 2005/0171918 A1 | 8/2005 | Eden et al. | |
| 2005/0235020 A1 | 10/2005 | Gabelmann et al. | |
| 2005/0246482 A1 | 11/2005 | Gabelmann et al. | |
| 2006/0010156 A1 | 1/2006 | Netz et al. | |
| 2006/0010294 A1 | 1/2006 | Pasumansky et al. | |
| 2006/0036518 A1 * | 2/2006 | O'Neill | G06Q 20/102 705/30 |
| 2006/0041458 A1 | 2/2006 | Ringrose et al. | |
| 2006/0041501 A1 | 2/2006 | Tabata et al. | |
| 2006/0059032 A1 | 3/2006 | Wong et al. | |
| 2006/0074980 A1 | 4/2006 | Sarkar | |

(56) References Cited

U.S. PATENT DOCUMENTS

| | | |
|---|---|---|
| 2006/0080264 A1 | 4/2006 | Zhang et al. |
| 2006/0085302 A1 | 4/2006 | Weiss et al. |
| 2006/0085465 A1 | 4/2006 | Nori et al. |
| 2006/0106658 A1 | 5/2006 | Johanson et al. |
| 2006/0116859 A1 | 6/2006 | Legault et al. |
| 2006/0116975 A1 | 6/2006 | Gould et al. |
| 2006/0126552 A1 | 6/2006 | Lee et al. |
| 2006/0136281 A1 | 6/2006 | Peters et al. |
| 2006/0143219 A1 | 6/2006 | Smith et al. |
| 2006/0161879 A1 | 7/2006 | Lubrecht et al. |
| 2006/0167703 A1 | 7/2006 | Yakov |
| 2006/0178960 A1 | 8/2006 | Lepman |
| 2006/0179012 A1 | 8/2006 | Jacobs |
| 2006/0190497 A1 | 8/2006 | Inturi et al. |
| 2006/0200400 A1 | 9/2006 | Hunter et al. |
| 2006/0200477 A1 | 9/2006 | Barrenechea |
| 2006/0212146 A1 | 9/2006 | Johnson et al. |
| 2006/0212334 A1 | 9/2006 | Jackson |
| 2006/0224740 A1 | 10/2006 | Sievers-Tostes |
| 2006/0224946 A1 | 10/2006 | Barrett et al. |
| 2006/0228654 A1 | 10/2006 | Sanjar et al. |
| 2006/0235785 A1 | 10/2006 | Chait et al. |
| 2006/0277074 A1 | 12/2006 | Einav et al. |
| 2006/0282429 A1 | 12/2006 | Hernandez-Sherrington et al. |
| 2007/0038494 A1 | 2/2007 | Kreitzbert et al. |
| 2007/0088641 A1 | 4/2007 | Aaron et al. |
| 2007/0113289 A1 | 5/2007 | Blumenau |
| 2007/0118516 A1 | 5/2007 | Li et al. |
| 2007/0124162 A1 | 5/2007 | Mekyska |
| 2007/0129892 A1 | 6/2007 | Smartt et al. |
| 2007/0179975 A1 | 8/2007 | Teh et al. |
| 2007/0185785 A1 | 8/2007 | Carlson et al. |
| 2007/0198317 A1 | 8/2007 | Harthcrycle et al. |
| 2007/0198982 A1 | 8/2007 | Bolan et al. |
| 2007/0214413 A1 | 9/2007 | Boeckenhauer |
| 2007/0226090 A1 | 9/2007 | Stratton |
| 2007/0260532 A1 | 11/2007 | Blake, III |
| 2007/0271203 A1 | 11/2007 | Delvat |
| 2007/0276755 A1 | 11/2007 | Rapp |
| 2007/0282626 A1 | 12/2007 | Zhang et al. |
| 2008/0027957 A1 | 1/2008 | Bruckner et al. |
| 2008/0033774 A1 | 2/2008 | Kimbrel et al. |
| 2008/0059945 A1 | 3/2008 | Sauer et al. |
| 2008/0060058 A1 | 3/2008 | Shea et al. |
| 2008/0065435 A1 | 3/2008 | Ratzloff |
| 2008/0071844 A1 | 3/2008 | Gopal et al. |
| 2008/0082186 A1 | 4/2008 | Hood et al. |
| 2008/0082435 A1 | 4/2008 | O'Brien et al. |
| 2008/0120122 A1 | 5/2008 | Olenski et al. |
| 2008/0201269 A1 | 8/2008 | Hollins et al. |
| 2008/0201297 A1 | 8/2008 | Choi et al. |
| 2008/0208647 A1 | 8/2008 | Hawley et al. |
| 2008/0208667 A1 | 8/2008 | Lymbery et al. |
| 2008/0222638 A1 | 9/2008 | Beaty et al. |
| 2008/0239393 A1* | 10/2008 | Navon .................. G06T 7/0075 358/1.16 |
| 2008/0255912 A1 | 10/2008 | Christiansen et al. |
| 2008/0295096 A1 | 11/2008 | Beaty et al. |
| 2008/0312979 A1 | 12/2008 | Lee et al. |
| 2008/0319811 A1 | 12/2008 | Casey |
| 2009/0012986 A1 | 1/2009 | Arazi et al. |
| 2009/0013325 A1 | 1/2009 | Kobayashi et al. |
| 2009/0018880 A1* | 1/2009 | Bailey .................. G06Q 10/06 705/7.37 |
| 2009/0063251 A1 | 3/2009 | Rangarajan et al. |
| 2009/0063540 A1 | 3/2009 | Mattox |
| 2009/0100017 A1 | 4/2009 | Graves et al. |
| 2009/0100406 A1 | 4/2009 | Greenfield et al. |
| 2009/0144120 A1 | 6/2009 | Ramachandran |
| 2009/0150396 A1 | 6/2009 | Elisha et al. |
| 2009/0195350 A1 | 6/2009 | Tsern et al. |
| 2009/0198535 A1 | 8/2009 | Brown et al. |
| 2009/0199192 A1 | 8/2009 | Laithwaite et al. |
| 2009/0216580 A1 | 8/2009 | Bailey et al. |
| 2009/0222742 A1 | 9/2009 | Pelton et al. |
| 2009/0234892 A1 | 9/2009 | Anglin et al. |
| 2009/0300173 A1 | 12/2009 | Bakman et al. |
| 2009/0319316 A1 | 12/2009 | Westerfeld et al. |
| 2010/0005014 A1 | 1/2010 | Castle et al. |
| 2010/0005173 A1 | 1/2010 | Baskaran et al. |
| 2010/0017344 A1 | 1/2010 | Hambrecht et al. |
| 2010/0042455 A1 | 2/2010 | Liu et al. |
| 2010/0049494 A1 | 2/2010 | Radibratovic et al. |
| 2010/0082380 A1 | 4/2010 | Merrifield, Jr. et al. |
| 2010/0094740 A1 | 4/2010 | Richter |
| 2010/0125473 A1 | 5/2010 | Tung et al. |
| 2010/0153282 A1 | 6/2010 | Graham |
| 2010/0161371 A1 | 6/2010 | Cantor et al. |
| 2010/0169477 A1 | 7/2010 | Stienhans et al. |
| 2010/0185557 A1 | 7/2010 | Hunter et al. |
| 2010/0198750 A1 | 8/2010 | Ron et al. |
| 2010/0211667 A1 | 8/2010 | O'Connell, Jr. |
| 2010/0250419 A1 | 9/2010 | Ariff et al. |
| 2010/0250421 A1 | 9/2010 | Ariff et al. |
| 2010/0250642 A1 | 9/2010 | Yellin et al. |
| 2010/0293163 A1 | 11/2010 | McLachlan et al. |
| 2010/0299233 A1 | 11/2010 | Licardi et al. |
| 2010/0306382 A1 | 12/2010 | Cardosa et al. |
| 2010/0323754 A1 | 12/2010 | Nakagawa |
| 2010/0325506 A1 | 12/2010 | Cai et al. |
| 2010/0325606 A1 | 12/2010 | Sundararajan et al. |
| 2010/0332262 A1 | 12/2010 | Horvitz et al. |
| 2010/0333109 A1 | 12/2010 | Milnor |
| 2011/0016214 A1 | 1/2011 | Jackson |
| 2011/0016448 A1 | 1/2011 | Bauder et al. |
| 2011/0022861 A1 | 1/2011 | Agneeswaran et al. |
| 2011/0066472 A1 | 3/2011 | Scheider |
| 2011/0066628 A1 | 3/2011 | Jayaraman |
| 2011/0072340 A1 | 3/2011 | Miller |
| 2011/0106691 A1 | 5/2011 | Clark et al. |
| 2011/0107254 A1 | 5/2011 | Moroze |
| 2011/0167034 A1 | 7/2011 | Knight et al. |
| 2011/0196795 A1 | 8/2011 | Pointer |
| 2011/0238608 A1 | 8/2011 | Sathish |
| 2011/0225277 A1 | 9/2011 | Freimuth et al. |
| 2011/0261049 A1 | 10/2011 | Cardno et al. |
| 2011/0295766 A1 | 12/2011 | Tompkins |
| 2011/0313947 A1 | 12/2011 | Grohovaz |
| 2012/0016811 A1 | 1/2012 | Jones |
| 2012/0023170 A1 | 1/2012 | Matignon et al. |
| 2012/0066020 A1 | 3/2012 | Moon et al. |
| 2012/0116990 A1 | 5/2012 | Huang |
| 2012/0131591 A1 | 5/2012 | Moorthi et al. |
| 2012/0150736 A1 | 6/2012 | Dickerson et al. |
| 2012/0185368 A1 | 7/2012 | Schloter et al. |
| 2012/0232947 A1 | 9/2012 | McLachlan et al. |
| 2012/0233217 A1 | 9/2012 | Purpus et al. |
| 2012/0233547 A1 | 9/2012 | McLachlan |
| 2012/0239739 A1 | 9/2012 | Manglik et al. |
| 2012/0246046 A1 | 9/2012 | Hirsch |
| 2012/0272234 A1 | 10/2012 | Kaiser et al. |
| 2012/0330869 A1 | 12/2012 | Durham |
| 2013/0028537 A1 | 1/2013 | Miyake et al. |
| 2013/0041792 A1 | 2/2013 | King et al. |
| 2013/0041819 A1 | 2/2013 | Khasho |
| 2013/0060595 A1 | 3/2013 | Bailey |
| 2013/0066866 A1 | 3/2013 | Chan et al. |
| 2013/0091456 A1 | 4/2013 | Sherman et al. |
| 2013/0091465 A1 | 4/2013 | Kikin-Gil et al. |
| 2013/0103654 A1 | 4/2013 | McLachlan et al. |
| 2013/0124454 A1 | 5/2013 | Bhide et al. |
| 2013/0124459 A1 | 5/2013 | Iwase et al. |
| 2013/0138470 A1 | 5/2013 | Goyal et al. |
| 2013/0173159 A1 | 7/2013 | Trum et al. |
| 2013/0179371 A1 | 7/2013 | Jain et al. |
| 2013/0201193 A1 | 8/2013 | McLachlan et al. |
| 2013/0227584 A1 | 8/2013 | Greene et al. |
| 2013/0268307 A1 | 10/2013 | Li et al. |
| 2013/0282537 A1 | 10/2013 | Snider |
| 2013/0293551 A1 | 11/2013 | Erez et al. |
| 2013/0339274 A1 | 12/2013 | Willis et al. |
| 2013/0346390 A1 | 12/2013 | Jerzak et al. |
| 2014/0006085 A1* | 1/2014 | McLachlan ............ G06Q 40/00 705/7.23 |

(56) References Cited

U.S. PATENT DOCUMENTS

| | | |
|---|---|---|
| 2014/0006222 A1 | 1/2014 | Hericks et al. |
| 2014/0067632 A1 | 3/2014 | Curtis |
| 2014/0075004 A1 | 3/2014 | Van Dusen et al. |
| 2014/0089509 A1 | 3/2014 | Akolkar et al. |
| 2014/0122374 A1 | 5/2014 | Hacigumus et al. |
| 2014/0129583 A1 | 5/2014 | Munkes et al. |
| 2014/0136295 A1* | 5/2014 | Wasser .............. G06Q 10/06312 705/7.38 |
| 2014/0143175 A1 | 5/2014 | Greenshields et al. |
| 2014/0172918 A1 | 6/2014 | Kornmann et al. |
| 2014/0229212 A1 | 8/2014 | MacElheron et al. |
| 2014/0244364 A1 | 8/2014 | Evers |
| 2014/0252095 A1 | 9/2014 | Kikin |
| 2014/0257928 A1 | 9/2014 | Chen et al. |
| 2014/0278459 A1 | 9/2014 | Morris |
| 2014/0279121 A1 | 9/2014 | George et al. |
| 2014/0279201 A1 | 9/2014 | Iyoob et al. |
| 2014/0279676 A1 | 9/2014 | Schafer et al. |
| 2014/0288987 A1 | 9/2014 | Liu |
| 2014/0337007 A1 | 11/2014 | Waibel et al. |
| 2014/0351166 A1 | 11/2014 | Schlossberg |
| 2014/0365503 A1 | 12/2014 | Franceschini et al. |
| 2014/0365504 A1 | 12/2014 | Franceschini et al. |
| 2015/0006552 A1 | 1/2015 | Lord |
| 2015/0012328 A1 | 1/2015 | McLachlan et al. |
| 2015/0046363 A1 | 2/2015 | McNamara et al. |
| 2015/0066808 A1 | 3/2015 | Legare et al. |
| 2015/0074075 A1 | 3/2015 | Alexander |
| 2015/0088584 A1 | 3/2015 | Santiago, III et al. |
| 2015/0120370 A1 | 4/2015 | Agrawal et al. |
| 2015/0278024 A1 | 10/2015 | Barman et al. |
| 2015/0294273 A1 | 10/2015 | Barraci et al. |
| 2015/0302303 A1 | 10/2015 | Hakim |
| 2015/0341230 A1 | 11/2015 | Dave et al. |
| 2016/0098234 A1 | 4/2016 | Weaver et al. |
| 2017/0102246 A1 | 3/2017 | Yang |
| 2018/0068246 A1 | 3/2018 | Crivat et al. |

OTHER PUBLICATIONS

Official Communication for U.S. Appl. No. 14/180,308 dated Oct. 19, 2016, 22 pages.
Official Communication for U.S. Appl. No. 14/977,368 dated Oct. 19, 2016, 5 pages.
Official Communication for U.S. Appl. No. 13/365,150 dated Oct. 24, 2016, 19 pages.
"Activity Based Costing is the best allocation methodology," APPTIO, Community for Technology Business Management, Mar. 16, 2010, 2 pages.
"Amazon Elastic Computer Cloud (Amazon EC2)", archive.org, Oct. 21, 2011, 9 pages. http://web.archive.org/web/20111029130914/http://aws.amazon.com/ec2/#pricing.
"Apptio Extends Leadership in Cloud Business Management with Launch of Apptio Cloud Express," Apptio, Dec. 12, 2012, 2 pages. http://www.apptio.com/news/apptio-extends-leadership-cloud-business-management-launch-apptio-cloud-express#.Ukm4r8X7Lco.
"Apptio Optimizes Enterprise IT Costs Utilizing Amazon Web Services Cloud Computing," Apptio, Apr. 7, 2009, 2 pages. http://www.apptio.com/news/apptio-optimizes-enterprise-it-costs-utilizing-amazon-web-services-cloud-computing#.Ukm5XsX7Lco.
"Automating Cost Transparency," Apptio, 2008, 15 pages httpo://www.cio.com/documents/whitepapers/AutomatedCostTransparency.pdf.
"Cloud Computing and Sustainability: The Environmental Benefits of Moving to the Cloud," Accenture, archive.org, Aug. 31, 2011, 17 pages http://web.archive.org/web/20110813022626/http://www.accenture.com/SiteCollectionDocuments/PDF/Accenture_Sustainability_Cloud_Computing_TheEnvironmentalBenefitsofMovingtotheCloud.pdf.
"IT Cost Transparency and Apptio," Dec. 4, 2008, 2 pages http://web.archive.org/web/20081204012158/http://www.apptio.com/solutions.

"Notice from the European Patent Office dated Oct. 1, 2007 concerning business methods," Official Journal EPO, Nov. 2007, pp. 592-593.
"Program Evaluation and Review Technique," Wkipedia, the free encyclopedia, accessed Mar. 13, 2012, 10 pages http://en.wikipedia.org/wiki/Program_Evaluation_and_Review_Technique—last modified Mar. 12, 2012.
"Project Management," Wkipedia, the free encyclopedia, accessed Mar. 13, 2012, 14 pages http://en.wikipedia.org/wiki/Project_management—last modified Mar. 7, 2012.
"Visualization for Production Management: Treemap and Fisheye Table Browser," Open-Video Organization webpages, 2001, 2 pages http://www.open-video.org/details.php?videoid=4547.
Busch, J., "Six Strategies for IT Cost Allocation," Spend Matters, Jan. 5, 2011, 3 pages http://spendmatters.com/2011/01/05/six-strategies-for-it-cost-allocation/.
Morgan, T. P., "Apptio puffs up freebie cost control freak for public clouds," The Register, Dec. 12, 2012, 2 pages http://www.theregister.co.uk/2012/12/12/apptio_cloud_express.
Ricknäs, M., "Apptio unveils tool to keep track of cloud costs," ComputerWorld, Dec. 12, 2012, 1 page http://www.computerworld.com/s/article/9234630/Apptio_unveils_tool_to_keep_track_ofcioud_costs.
Talbot, C., "Apptio Cloud Express Provides Free Usage Tracking Service," talkincloud.com, Dec. 12, 2012, 4 pages. http://talkincloud.com/cloud-computing-management/apptio-cloud-express-provides-free-usage-tracking-service.
Vizard, M., "Free Service from Apptio Tracks Cloud Service Provider Pricing," IT Business Edge, Dec. 12, 2012, 6 pages http://www.itbusinessedge.com/blogs/it-unmasked/free-service-from-apptio-tracks-cloud-service-provider-pricing.html.
International Search Report and Written Opinion for International Patent Application No. PCT/US2010/035021 dated Jul. 14, 2010, 12 pages.
International Preliminary Report on Patentability for International Patent Application No. PCT/US2010/035021 dated Nov. 24, 2011, 10 pages.
International Search Report and Written Opinion for International Patent Application No. PCT/US2012/028353 dated Oct. 31, 2012, 9 pages.
International Preliminary Report on Patentability for International Patent Application No. PCT/US2012/028353 dated Sep. 19, 2013, 6 pages.
International Search Report and Written Opinion for International Patent Application No. PCT/US2012/028378 dated Sep. 12, 2012, 11 pages.
International Preliminary Report on Patentability for International Patent Application No. PCT/US2012/028378 dated Sep. 19, 2013, 7 pages.
Extended European Search Report in EP Application No. 13151967.0-1955, dated Apr. 19, 2013, 8 pages.
Official Communication for U.S. Appl. No. 12/467,120 dated Oct. 4, 2011, 12 pages.
Official Communication for U.S. Appl. No. 12/467,120 dated Jun. 20, 2012, 17 pages.
Official Communication for U.S. Appl. No. 12/467,120 dated Aug. 29, 2012, 3 pages.
Official Communication for U.S. Appl. No. 12/467,120 dated Oct. 23, 2013, 21 pages.
Official Communication for U.S. Appl. No. 12/467,120 dated Mar. 26, 2013, 18 pages.
Official Communication for U.S. Appl. No. 13/324,253 dated Sep. 25, 2012, 17 pages.
Official Communication for U.S. Appl. No. 13/324,253 dated Jan. 10, 2013, 20 pages.
Official Communication for U.S. Appl. No. 13/324,253 dated Mar. 19, 2013, 3 pages.
Official Communication for U.S. Appl. No. 13/324,253 dated Sep. 6, 2013, 21 pages.
Official Communication for U.S. Appl. No. 13/415,797 dated Oct. 3, 2013, 17 pages.
Official Communication for U.S. Appl. No. 13/452,628 dated Apr. 22, 2013, 11 pages.

(56) References Cited

OTHER PUBLICATIONS

Official Communication for U.S. Appl. No. 13/675,837 dated Oct. 10, 2013, 41 pages.
Official Communication for U.S. Appl. No. 13/837,815 dated Oct. 23, 2013, 9 pages.
Official Communication for U.S. Appl. No. 13/917,478 dated Nov. 7, 2013, 15 pages.
Official Communication for U.S. Appl. No. 13/917,503 dated Oct. 10, 2013, 41 pages.
Official Communication for U.S. Appl. No. 13/935,147 dated Oct. 22, 2013, 16 pages.
Office Communication for U.S. Appl. No. 13/649,019 dated Sep. 23, 2015, 15 pages.
Office Communication for U.S. Appl. No. 13/365,150 dated Sep. 24, 2015, 15 pages.
Office Communication for U.S. Appl. No. 14/033,130 dated Sep. 15, 2015, 22 pages.
Official Communication for U.S. Appl. No. 13/452,628 dated Jan. 12, 2016, 21 pages.
Official Communication for U.S. Appl. No. 13/649,019 dated Jan. 4, 2016, 8 pages.
European Examination Report for U.S. Appl. No. 14159413.5 dated Jul. 15, 2015, 9 pages.
Office Communication for U.S. Appl. No. 13/415,701 dated Oct. 27, 2015, 16 pages.
Official Communication for U.S. Appl. No. 14/869,721 dated Jan. 13, 2016, 57 pages.
Office Communication for U.S. Appl. No. 13/675,837 dated Oct. 26, 2015, 20 pages.
Office Communication for U.S. Appl. No. 13/917,503 dated Oct. 22, 2015, 19 pages.
Office Communication for U.S. Appl. No. 14/722,663 dated Dec. 1, 2015, 37 pages.
Official Communication for U.S. Appl. No. 13/452,628 dated Nov. 18, 2013, 15 pages.
Official Communication for U.S. Appl. No. 14/033,130 dated Dec. 16, 2013, 15 pages.
Official Communication for U.S. Appl. No. 13/324,253 dated Jan. 23, 2014, 15 pages.
Official Communication for U.S. Appl. No. 13/675,837 dated Jan. 31, 2014, 37 pages.
Official Communication for U.S. Appl. No. 13/917,503 dated Jan. 31, 2014, 25 pages.
Robinson Glen, Cloud Economics—Cost Optimization (selected slides), Amazon Web Services AWS, Slideshare, Feb. 28, 2012 http://www.slideshare.net/AmazonWebServices/whats-new-with-aws-london.
Skilton et al, Building Return on Investment from Cloud Computing, The open Group Whitepaper, mladina webpages, Apr. 2010 http://www.mladina.si/media/objave/dokumenti/2010/5/31/31_5_2010_open_group building_return-on-investment-from-cloud-computing.pd.
Ward Miles, Optimizing for Cost in the Cloud (selection), AWS Summit, Slideshare Apr. 2012 http://www.slideshare.net/AmazonWebServices/optimizing-your-infrastructure-costs-on-aws.
Amazon Reserved Instances, Amazon Web Services, archives org, Jan. 14, 2013 http://web.archive.org/web/2012011453849/http://aws.amazon.com/rds/reserved-instances/?.
Cost Optimisation with Amazon Web Services, extracted slides, Slideshare Jan. 30, 2012 http://www.sideshare.net/AmazonWebServices/cost-optimisation-with-amazon-web-services?from_search=1
Deciding an Approach to the cloud AWS Reserved Instances, Cloudyn webpages, Feb. 28, 2012 https://www.cloudyn.com/blog/deciding-an-approach-to-the-cloud-aws-reserved-aws.
Ganesan Harish, Auto Scaling using AWS, Amazon Web Services AWS (selected slides), Apr. 20, 2011 http://www.slideshare.net/harishganesan/auto-scaling-using-amazon-web-services-aws.
Office Communication for U.S. Appl. No. 13/415,797 dated Apr. 9, 2014, 18 pages.
Office Communication for U.S. Appl. No. 13/324,253 dated Apr. 9, 2014, 3 pages.
Office Communication for U.S. Appl. No. 13/324,253 dated Oct. 24, 2014, 26 pages.
Office Communication for U.S. Appl. No. 13/365,150 dated Dec. 3, 2014, 16 pages.
Office Communication for U.S. Appl. No. 13/452,628 dated Oct. 1, 2014, 14 pages.
Office Communication for U.S. Appl. No. 13/837,815 dated Apr. 7, 2014, 14 pages.
Office Communication for U.S. Appl. No. 13/365,150 dated Dec. 7, 2015, 3 pages.
Office Communication for U.S. Appl. No. 13/675,837 dated Apr. 2, 2014, 3 pages.
Office Communication for U.S. Appl. No. 13/917,503 dated Apr. 3, 2014, 3 pages.
Office Communication for U.S. Appl. No. 13/935,147 dated Apr. 11, 2014, 22 pages.
Office Communication for U.S. Appl. No. 13/935,147 dated Jun. 16, 2014, 3 pages.
Office Communication for U.S. Appl. No. 14/033,130 dated May 27, 2014, 22 pages.
Office Communication for U.S. Appl. No. 14/033,130 dated Aug. 5, 2014, 3 pages.
Office Communication for U.S. Appl. No. 14/180,308 dated Jan. 30, 2015, 21 pages.
Office Communication for U.S. Appl. No. 14/180,308 dated Apr. 8, 2014, 16 pages.
Office Communication for U.S. Appl. No. 13/452,628 dated Mar. 13, 2014, 15 pages.
SAS Activity-Based Management, 2010, Fact Sheet, 4 pages.
Office Communication for U.S. Appl. No. 14/180,308 dated Sep. 2, 2014, 19 pages.
Office Communication for U.S. Appl. No. 14/180,306 dated Apr. 17, 2015, 5 pages.
Extended European Search Report in EP Application No. 14159413.5 dated Jul. 4, 2014, 11 pages.
Office Communication for U.S. Appl. No. 13/415,797 dated Jan. 12, 2015, 20 pages.
Office Communication for U.S. Appl. No. 13/837,815 dated Sep. 25, 2014, 16 pages.
Office Communication for U.S. Appl. No. 13/324,253 dated Feb. 19, 2015, 22 pages.
Henriet et al. "Traffic-Based Cost Allocation in a Network." The Rand Journal of Economics, 1996, pp. 332-345.
Rudnick et al., "Marginal Pricing and Supplement Cost Allocation in Transmission Open Access." Power Systems, IEEE Transactions on 10.2, 1995, pp. 1125-1132.
Office Communication for U.S. Appl. No. 13/949,019 dated Feb. 10, 2015, 14 pages.
European Search Report for Appl. No. 12755613.2 dated Jan. 26, 2015, 6 pages.
Office Communication for U.S. Appl. No. 13/452,628 dated Mar. 30, 2015, 18 pages.
Office Communication for U.S. Appl. No. 13/917,503 dated Apr. 16, 2015, 19 pages.
Office Communication for U.S. Appl. No. 13/675,837 dated Apr. 16, 2015, 19 pages.
Office Communication for U.S. Appl. No. 13/837,815 dated Apr. 27, 2015, 18 pages.
Office Communication for U.S. Appl. No. 13/452,628 dated Jun. 23, 2015, 3 pages.
Office Communication for U.S. Appl. No. 13/415,797 dated Jul. 23, 2015, 22 pages.
International Search Report and Written Opinion for PCT/US2015/015486 dated Jun. 29, 2015, 13 pages.
Office Communication for U.S. Appl. No. 13/935,147 dated Jul. 9, 2015, 6 pages.
Official Communication for U.S. Appl. 13/415,797 dated Oct. 19, 2015, 3 pages.
Official Communication for U.S. Appl. 13/837,815 dated Sep. 28, 2015, 20 pages.

(56) References Cited

OTHER PUBLICATIONS

Chien-Liang Fok et al., "Rapid Developoment and Flexible of Adaptive Wireless Sensor Network Applications," Proceedings of the 25th IEEE International Conference on Distributed Computing Systems, 2005, pp. 653-662 (10 pages).
Frans Flippo et al., "A Framework for Rapid Development of Multimodal Interfaces," Proceedings of the 5th International Conference on Multimodal Interfaces, 2003, pp. 109-116 (8 pages).
David B. Stewart et al., "Rapid Development of Robotic Applications Using Component-Based Real-Time Software," Intelligent Robots arid Systems 1995, Human Robot Interaction and Cooperative Robots Proceedings, 1995, IEEE International Conference on vol. 1, pp. 465-470 (6 pages).
Office Communication for U.S. Appl. No. 14/846,349 dated Dec. 17, 2015, 23 pages.
International Search Report and Written Opinion for PCT/US2015/048697 dated Mar. 31, 2016, 9 pages.
Office Communication for U.S. Appl. No. 13/365,150, dated Apr. 6, 2016, 11 pages.
Office Communication for U.S. Appl. No. 14/722,663, dated Mar. 31, 2016, 5 pages.
Van Diessen et al., "Component Business Model for Digital Repositories: A Framework for Analysis," AAAI, 2008, 7 pages.
Melcher et al., "Visualization and Clustering of Business Process Collections Based on Process Metric Values," IEEE Computer Society, 2008, 4 pages.
Lee et al., "Value-Centric, Model-Driven Business Transformation," IEEE, 2008, 8 pages.
Lee et al., "Business Transformation Workbench: A Practitioner's Tool for Business Transformation," IEEE International Conference on Services Computing, 2008, 8 pages.
Risch et al., "Interactive Information Visualization for Exploratory Intelligence Data Analysis," IEEE Proceedings of VRAIS, 1996, 10 pages.
Office Communication for U.S. Appl. No. 13/415,797, dated Apr. 4, 2016, 24 pages.
Office Communication for U.S. Appl. No. 13/837,815, dated Apr. 13, 2016, 22 pages.
Official Communication for U.S. Appl. No. 14/869,721 dated Aug. 3, 2016, 5 pages.
Official Communication for U.S. Appl. No. 13/452,628 dated Aug. 18, 2016, 22 pages.
Official Communication for U.S. Appl. No. 13/935,147 dated Mar. 9, 2016, 10 pages.
Official Communication for U.S. Appl. No. 14/033,130 dated Feb. 18, 2016, 22 pages.
Rehman, Abida, "Reciprocal Method of Cost Allocation—Service Department Costing." http//www.accountingdetails.com/reciprocal_method.htm, 2016, 9 pages.
DeBusk, Gerald K., "Using Spreadsheet Software to Teach the Reciprocal Method of Service Department Cost Allocation, " Jan. 21, 2011, 6 pages.
Official Communication for U.S. Appl. No. 13/415,797 dated Jan. 11, 2017, 25 pages.
Official Communication for U.S. Appl. No. 13/675,837 dated Jan. 11, 2017, 29 pages.
Efficient frontier—Wikipedia, Efficient frontier, Wikipedia wehpages, Oct. 30, 2016, https://en.wikipedia.org/wiki/Efficient_frontier, 2 pages.
Official Communication for U.S. Appl. No. 13/917,503 dated Jan. 12, 2017, 27 pages.
Official Communication for U.S. Appl. No. 14/033,130 dated Jan. 11, 2017, 12 pages.
Official Communication for U.S. Appl. No. 14/867,552 dated Jan. 9, 2017, 3 pages.
Official Communication for U.S. Appl. No. 15/351,313 dated Jan. 12, 2017, 7 pages.
Official Communication for U.S. Appl. No. 14/180,308 dated Feb. 8, 2017, 3 pages.
Official Communication for U.S. Appl. No. 14/846,349 dated Mar. 1, 2017, 27 pages.
Official Communication for U.S. Appl. No. 13/935,147 dated Mar. 7, 2017, 12 pages.
Official Communication for U.S. Appl. No. 13/365,150 dated Mar. 15, 2017, 19 pages.
Official Communication for U.S. Appl. No. 13/452,628 dated Mar. 9, 2017, 24 pages.
Official Communication for U.S. Appl. No. 15/379,267 dated Mar. 10, 2017, 11 pages.
Official Communication for U.S. Appl. No. 13/365,150 dated May 22, 2017, 3 pages.
Official Communication for U.S. Appl. No. 13/917,503 dated May 16, 2017, 29 pages.
Official Communication for U.S. Appl. No. 14/869,721 dated May 5, 2017, 49 pages.
Official Communication for U.S. Appl. No. 14/981,747 dated May 19, 2017, 43 pages.
Official Communication for U.S. Appl. No. 15/271,013 dated May 19, 2017, 37 pages.
Official Communication for U.S. Appl. No. 14/180,308 dated May 25, 2017, 21 pages.
Official Communication for U.S. Appl. No. 15/379,267 dated Jun. 30, 2017, 16 pages.
Official Communication for U.S. Appl. No. 14/367,552 dated Jun. 29, 2017, 31 pages.
Official Communication for U.S. Appl. No. 14/033,130 dated Jun. 29, 2017, 18 pages.
Official Communication for U.S. Appl. No. 13/837,815 dated Jun. 12, 2017, 12 pages.
Official Communication for U.S. Appl. No. 13/837,815 dated Nov. 9, 2016, 11 pages.
Official Communication for U.S. Appl. No. 15/271,013 dated Dec. 15, 2016, 50 pages.
Official Communication for U.S. Appl. No. 14/867,552 dated Nov. 29, 2017, 12 pages.
Official Communication for U.S. Appl. No. 14/981,747 dated Dec. 12, 2017, 44 pages.
Official Communication for U.S. Appl. No. 14/033,130 dated Dec. 20, 2017, 12 pages.
Official Communication for U.S. Appl. No. 14/369,721 dated Oct. 17, 2017, 30 pages.
Official Communication for U.S. Appl. No. 15/379,267 dated Oct. 6, 2017, 3 pages.
Official Communication for U.S. Appl. No. 13/935,147 dated Nov. 3, 2017, 11 pages.
Official Communication for U.S. Appl. No. 14/846,349 dated Nov. 20, 2017, 3 pages.
Official Communication for U.S. Appl. No. 13/917,503 dated Nov. 28, 2017 26 pages.
Official Communication for U.S. Appl. No. 15/351,313 dated Jul. 18, 2017, 15 pages.
Official Communication for U.S. Appl. No. 13/365,150 dated Aug. 23, 2017, 30 pages.
Official Communication for European Application No. 13151967.0 dated Aug. 18, 2017, 7 pages.
European Search Report for European Application No. 10775643.3 dated Mar. 10, 2017, 6 pages.
Official Communication for European Application No. 12755613.2 dated Aug. 17, 2017, 7 pages.
Official Communication for U.S. Appl. No. 14/033,130 dated Sep. 7, 2017, 3 pages.
Official Communication for U.S. Appl. No. 14/846,349 dated Sep. 8, 2017, 25 pages.
Official Communication for U.S. Appl. No. 13/452,623 dated Sep. 28, 2017, 26 pages.
Official Communication for U.S. Appl. No. 13/837,315 dated Sep. 28, 2017, 9 pages.
Official Communication for U.S. Appl. No. 13/415,797 dated Sep. 7, 2017, 26 pages.
Official Communication for U.S. Appl. No. 13/917,503 dated Jul. 19, 2018, pp. 1-3.

(56) References Cited

OTHER PUBLICATIONS

Official Communication for U.S. Appl. No. 14/846,349 dated Jul. 20, 2018, pp. 1-40.
Official Communication for U.S. Appl. No. 14/981,747 dated Jul. 5, 2018, pp. 1-62.
Official Communication for U.S. Appl. No. 15/271,013 dated Jul. 6, 2018, pp. 1-49.
Official Communication for U.S. Appl. No. 15/379,267 dated Jul. 19, 2018, pp. 1-34.
Official Communication for U.S. Appl. No. 13/837,815 dated Jan. 26, 2018, 12 pages.
Official Communication for U.S. Appl. No. 14/869,721 dated Jan. 19, 2018, 3 pages.
Official Communication for U.S. Appl. No. 14/667,552 dated Feb. 13, 2018, 3 pages.
Official Communication for U.S. Appl. No. 15/859,008 dated Mar. 5, 2018, 20 pages.
Official Communication for U.S. Appl. No. 13/935,147 dated Jan. 17, 2018, 3 pages.
Official Communication for U.S. Appl. No. 14/180,308 dated Dec. 22, 2017, 18 pages.
Official Communication for U.S. Appl. No. 15/271,013 dated Dec. 27, 2017, 35 pages.
Official Communication for U.S. Appl. No. 14/846,349 dated Jan. 18, 2018, 29 pages.
Official Communication for U.S. Appl. No. 15/379,267 dated Jan. 2, 2018, 15 pages.
Official Communication for U.S. Appl. No. 15/351,313 dated Jan. 8, 2018, 11 pages.
Official Communication for U.S. Appl. No. 13/935,147 dated Aug. 10, 2018, pp. 1-25.
Official Communication for U.S. Appl. No. 14/033,130 dated Aug. 9, 2018, pp. 1-47.
Official Communication for U.S. Appl. No. 15/858,945 dated Sep. 10, 2018, pp. 1-25.
Official Communication for U.S. Appl. No. 15/859,008 dated Jul. 31, 2018, pp. 1-28.
Official Communication for U.S. Appl. No. 14/180,308 dated Aug. 6, 2018, pp. 1-23.
Official Communication for U.S. Appl. No. 13/917,503 dated May 10, 2018, pp. 1-38.
Official Communication for U.S. Appl. No. 13/837,815 dated Apr. 5, 2018, pp. 1-4.
Official Communication for U.S. Appl. No. 14/869,721 dated May 11, 2018, pp. 1-33.
Official Communication for U.S. Appl. No. 15/351,313 dated Jun. 4, 2018, pp. 1-9.
Official Communication for U.S. Appl. No. 15/858,945 dated Apr. 4, 2018, pp. 1-74.
Official Communication for U.S. Appl. No. 15/859,058 dated May 14, 2018, pp. 1-76.
Official Communication for U.S. Appl. No. 13/935,147 dated Apr. 5, 2018, pp. 1-14.
Official Communication for U.S. Appl. No. 14/867,552 dated May 31, 2018, pp. 1-22.
Official Communication for U.S. Appl. No. 13/917,503 dated Apr. 1, 2019, pp. 1-34.
Official Communication for U.S. Appl. No. 13/935,147 dated Mar. 28, 2019, pp. 1-16.
Official Communication for U.S. Appl. No. 14/033,130 dated Apr. 10, 2019, pp. 1-9.
Communication for U.S. Appl. No. 14/180,308 dated Feb. 26, 2019, pp. 1-28.
Communication for U.S. Appl. No. 14/867,552 dated Feb. 11, 2019, pp. 1-8.
Communication for U.S. Appl. No. 14/981,747 dated Dec. 26, 2018, pp. 1-50.
Communication for U.S. Appl. No. 15/271,013 dated Mar. 28, 2019, pp. 1-53.
Communication for U.S. Appl. No. 15/351,313 dated Apr. 1, 2019, pp. 1-31.
Communication for U.S. Appl. No. 15/585,945 dated Feb. 6, 2019, pp. 1-15.
Official Communication for U.S. Appl. No. 15/859,058 dated Mar. 25, 2019, pp. 1-24.
Official Communication for U.S. Appl. No. 14/033,130 dated Dec. 18, 2018, pp. 1-11.
Official Communication for U.S. Appl. No. 14/867,552 dated Nov. 21, 2018, pp. 1-37.
Official Communication for U.S. Appl. No. 15/379,267 dated Oct. 18, 2018, pp. 1-9.
Official Communication for U.S. Appl. No. 15/271,013 dated Dec. 18, 2018, pp. 1-47.
Official Communication for U.S. Appl. No. 15/859,058 dated Dec. 5, 2018, pp. 1-20.
Official Communication for U.S. Appl. No. 15/859,008 dated Apr. 12, 2019, pp. 1-19.
Official Communication for U.S. Appl. No. 13/917,503 dated Apr. 1, 2019.
Official Communication for U.S. Appl. No. 13/935,147 dated Mar. 28, 2019.
Official Communication for U.S. Appl. No. 14/033,130 dated Apr. 10, 2019.
Official Communication for U.S. Appl. No. 14/180,308 dated Feb. 26, 2019.
Official Communication for U.S. Appl. No. 14/867,552 dated Feb. 11, 2019.
Official Communication for U.S. Appl. No. 14/981,747 dated Dec. 26, 2018.
Official Communication for U.S. Appl. No. 15/271,013 dated Mar. 28, 2019.
Official Communication for U.S. Appl. No. 15/351,313 dated Apr. 1, 2019.
Official Communication for U.S. Appl. No. 15/585,945 dated Feb. 6, 2019.
Official Communication for U.S. Appl. No. 15/859,058 dated Mar. 25, 2019.
Official Communication for U.S. Appl. No. 14/033,130 dated Dec. 18, 2018.
Official Communication for U.S. Appl. No. 14/867,552 dated Nov. 21, 2018.
Official Communication for U.S. Appl. No. 15/379,267 dated Oct. 18, 2018.
Official Communication for U.S. Appl. No. 15/271,013 dated Dec. 18, 2018.
Official Communication for U.S. Appl. No. 15/859,058 dated Dec. 5, 2018.
Official Communication for U.S. Appl. No. 15/859,008 dated Apr. 12, 2019.
Official Communication for U.S. Appl. No. 14/869,721 dated Jun. 20, 2019, pp. 1-346.
Official Communication for U.S. Appl. No. 14/180,308 dated Jun. 11, 2019, pp. 1-26.
Official Communication for U.S. Appl. No. 15/351,313 dated Jun. 14, 2019, pp. 1-9.
Official Communication for U.S. Appl. No. 14/981,747 dated May 8, 2019, pp. 1-77.
Official Communication for U.S. Appl. No. 15/271,013 dated Jun. 14, 2019, pp. 1-8.

* cited by examiner $$A = \begin{bmatrix} 1 & 0 & 0 \\ 0 & 1 & 0 \\ 0 & 0 & 1 \end{bmatrix} \quad \overset{906}{} \qquad B = \begin{bmatrix} 0 \\ 0 \\ 0 \end{bmatrix} \quad \overset{908}{}$$

*FIG. 9D*

$$A = \begin{bmatrix} 1 & -0.75 & 0 \\ -0.0625 & 1 & 0 \\ 0 & -0.333 & 1 \end{bmatrix} \quad \overset{910}{} \qquad B = \begin{bmatrix} \$20{,}000 \\ \$5{,}000 \\ \$10{,}000 \end{bmatrix} \quad \overset{912}{}$$

| Address | 8 bytes |
|---|---|
| 0 | 1 |
| 1 | -0.75 |
| 2 | 0 |
| 3 | -0.0625 |
| 4 | 1 |
| 5 | 0 |
| 6 | 0 |
| 7 | -0.333 |
| 8 | 1 |
| 9 | 20000 |
| 10 | 5000 |
| 11 | 10000 |

916

| Address | 8-bit |
|---|---|
| 0 | |
| 1 | |
| 2 | |
| 3 | 1 |
| 4 | |
| 5 | |
| 6 | |
| 7 | |
| ... | ... |
| 88 | |
| 89 | |
| 90 | |
| 91 | |
| 92 | 10000 |
| 93 | |
| 94 | |
| 95 | |

*FIG. 9F*

RECIPROCAL MODELS FOR RESOURCE ALLOCATION

TECHNICAL FIELD

The present invention relates generally to computer automated activity based resource allocation modeling, and more particularly, but not exclusively to analysis of complex resource allocation data models.

BACKGROUND

Businesses that strive to remain viable and successful in today's competitive commercial environment are required to adopt accurate and responsive resource allocation and resource budgeting practices. To improve efficiency, businesses may use models that apply modern budgeting, forecasting and resource accounting techniques. For some resource allocation techniques, the complexity of the underlying data models may increase as the number of tracked activities and elements increases. Therefore, for larger enterprises, sophisticated computer programs and computers are often required to assist in generating useful and relevant resource models for analyzing resource allocations. In some cases, the large number of items and entities required for enterprise scale resource modeling may make development of resource models difficult. Further, the size and complexity of modern resource allocation models may make it difficult to generate reporting information based on the model because of prohibitively long computation times. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Description of the Various Embodiments, which is to be read in association with the accompanying drawings, wherein:

FIGS. 9A-9F illustrate data structures configured and arranged to improve support allocating resources using reciprocal models in accordance with at least one of the various embodiments;

DETAILED DESCRIPTION OF THE VARIOUS EMBODIMENTS

Figure 1:
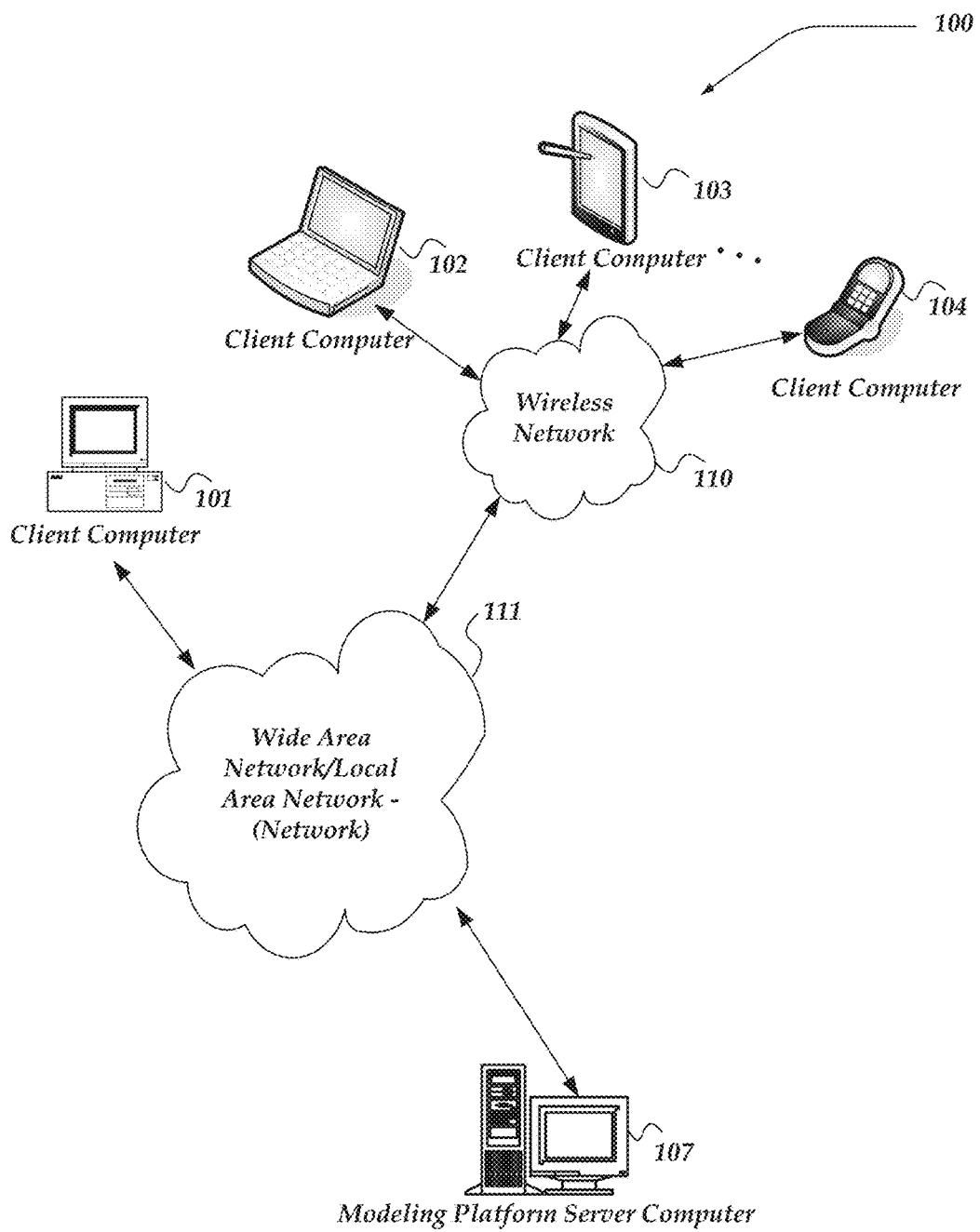
FIG. 1 illustrates a system diagram showing components of an environment in which at least one of the various embodiments may be practiced.

The present innovations now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "resource allocation model," and "data model" refer to a graph based representation of a system of resource allocation rules that may be used for tracking/analyzing resource allocation, resource consumption, resource budgeting, or the like. Nodes in the model may represent groups of items or objects that may be associated with resources and/or resource allocations. The edges of the graph may represent how resources may be allocated between the nodes (objects). A financial allocation model may be a visual rendering of a graph showing the nodes and the edges connecting the nodes.

As used herein, the term "model line item," refers to a single line item in a data model and its associated characteristics, including resources, costs, description, or the like. For example, the costs associated with a particular computer that is an email server may be represented by a single model line item having a particular cost (e.g., the email server may correspond to a model line item).

As used herein, the term "category," or "model object" refers to a set and/or class of model line items that may be grouped together. Also, dataset information may be mapped to one or more categories by a modeling engine. For example, a collection of computers performing services such as email, web serving, enterprise resource planning, may represent separate model line items and they may be grouped into the Servers category and/or Servers Object. Nodes in the data model graph may be considered to represent model objects.

As used herein, the term "allocation rules" refer to rules in the data model that determine how the resources from a model object are apportioned between/among other model objects in the data model. Also, such rules may be assigned to individual model line items. For example, if an email server line item has a value of $1000 an allocation rule may be defined such that 50% of the expense may be allocated to the Marketing department and 50% may be allocated to the Engineering department. Also, allocation rules may be applied at the model objects as well as the model line item level.

As used herein, the term "assignment ratios," refers to the results of applying one or more allocation rules and it is the distribution ratio of resources to model line items or model objects. For example, if $1000 may be allocated to Servers object, and the model line item Email Server is allocated $800 and the model line item FTP Server is allocated $200, the assignment ratios may be determined to 80% to model line item Email Server and 20% to model line item FTP Server. Assignment ratios may be explicitly defined by allocation rules. Or, in some case, they may be derived from allocation tables by converting the values into ratios of the total allocation to the model object.

As used herein, the term "external data source" refers to any separately located system that may enable and/or provide access to one or more datasets of information.

As used herein, the term "dataset" refers to a collection of data, usually presented in tabular form. Each column may represent a particular variable. Each row may represent a given member of the dataset. Also, it may list values for fields for each of the variables, such as name, location, cost, owner, manufacturer, serial number, or the like. Non-tabular datasets can also take the form of marked up strings of characters, such as an XML, file.

As used herein, the term "model object" refers to items that comprise a given data model. In some cases, model objects comprising data models may also be considered categories in financial allocation models, cost models, or the like.

As used herein, the term "source object" refers to a model object in a data model that may be providing resource values (e.g., costs/expenses) that may be allocated to one or more other model objects (target objects).

As used herein, the term "target object" refers to a model object in a data model that may be allocated resources (e.g., costs/expenses) from one or more other model objects (source objects).

As used herein, the term "pass-through object" refers to a model object in a data model that may be allocated resources from one or more other model objects. A pass-through object may be considered an intermediate object. E.g., it is a target for objects "below", in the graph, as well as a source for objects "above" in the allocation graph. Furthermore, in some embodiments, a pass-through object may be an intermediate object that does not offer services at a fixed price. Pass-through objects are intended to model services that price their offered services/resources according to their resource costs. Pass-through objects may model services that attempt to recover exactly the resource costs required to provide their offered services/goods. Accordingly, pass-through objects may be differentiated from other priced objects that may have fixed prices per units of service, regardless of their resource costs. The resource costs for priced objects may be trivial to compute (e.g., price times quantity), while the resource costs for pass-through objects may be determined using a reciprocal model.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards for managing data models for managing resource allocation. In at least one of the various embodiments, a data model portion that may be comprised of two or more nodes and one or more edges from a data model stored in a memory of the network computer may be provided. In some embodiments, the memory may be configured and arranged to store the data model. Also, in some embodiments, each node may represent a model object and each edge may represent a resource allocation.

In at least one of the various embodiments, allocation information based on each resource allocation that is associated with one or more pass-through objects that may be included in the data model portion may be provided such that the allocation information may include a count of resource units allocated by the one or more pass-through objects and a count of fixed resource value units allocated to the one or more pass-through objects. In at least one of the various embodiments, providing the allocation information may include: if a resource allocation includes a pass-through object that may be a source object, incrementing a count of resource units allocated to the pass-through object that is the source object; and if the resource allocation includes a pass-through object that is a target object, incrementing a count of fixed resource value units allocated to the pass-through object that is the target object.

In at least one of the various embodiments, a memory buffer that is arranged and configured to include allocation ratio information and fixed resource value information that are based on the allocation information may be provided. In at least one of the various embodiments, providing the memory buffer may include configuring and arranging the memory buffer into a contiguous memory buffer; storing the allocation ratio information in the contiguous memory buffer; and storing the fixed resource value information in the contiguous memory buffer adjacent to the allocation ratio information.

In at least one of the various embodiments, providing the allocation ratio information may include: storing the allocation ratio information in a matrix data structure; and storing the fixed resource value information in a vector data structure.

In at least one of the various embodiments, a reciprocal model based on the memory buffer and the data model portion may be provided. In some embodiments, the reciprocal model may remain associated with the data model portion in the data model. In at least one of the various embodiments, providing the reciprocal model may include providing an effective resource value engine based on solving a linear system corresponding to the allocation ratio information and the fixed resource value information.

In at least one of the various embodiments, if resource information for a pass-through object associated with the reciprocal model may be requested, the reciprocal model may be employed to provide the resource information to the data model.

In at least one of the various embodiments, one or more other reciprocal models that may correspond to one or more other data model portions of the data model may be provided.

In at least one of the various embodiments, the data model may be traversed to provide one or more data model portions, such that the one or more data model portions each include at least one pass-through object.

In at least one of the various embodiments, a visualization that display the data model may be provided, such that the reciprocal model may be concealed by the visualization that displays the data model.

Illustrated Operating Environment

FIG. 1 shows components of one embodiment of an environment in which at least one of the various embodiments may be practiced. Not all of the components may be required to practice various embodiments, and variations in the arrangement and type of the components may be made. As shown, system 100 of FIG. 1 includes local area networks ("LANs")/wide area networks ("WANs")-(network) 111, wireless network 110, client computer 101-104, and Modeling Platform Server 107.

Generally, client computers 102-104 may include virtually any portable computing device capable of receiving and sending a message over a network, such as network 111, wireless network 110, or the like. Client computers 102-104 may also be described generally as client computers that are configured to be portable. Thus, client computers 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. As such, client computers 102-104 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client computer 101 may include virtually any computing device capable of communicating over a network to send and receive information, including messaging, performing various online actions, or the like. The set of such devices may include devices that typically connect using a wired or wireless communications medium such as personal computers, tablet computers, multiprocessor systems, microprocessor-based or programmable consumer electronics, network Personal Computers (PCs), or the like. In at least one of the various embodiments, at least some of client computers 102-104 may operate over wired and/or wireless network. Today, many of these devices include a capability to access and/or otherwise communicate over a network such as network 111 and/or wireless network 110. Moreover, client computers 102-104 may access various computing applications, including a browser, or other web-based application.

In at least one of the various embodiments, one or more of client computers 101-104 may be configured to operate within a business or other entity to perform a variety of services for the business or other entity. For example, client computers 101-104 may be configured to operate as a web server, an accounting server, a production server, an email server, video game server, an inventory server, or the like. However, client computers 101-104 are not constrained to these services and may also be employed, for example, as an end-user computing node, in other embodiments. Further, it should be recognized that more or less client computers may be included within a system such as described herein, and embodiments are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In at least one of the various embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In at least one of the various embodiments, a user of the client computer may employ the browser application to perform various actions over a network.

Client computers 101-104 also may include at least one other client application that is configured to receive and/or send data, including resource allocation information, report requests (e.g., queries) between another computing device. Client applications may include a capability to provide requests and/or receive data relating to the data models, reports, project information, allocation rules, or the like. The client application may provide data representing assignment and/or allocation changes, selecting templates, editing cost allocations between or among categories, generating and/or modifying recursive allocation rules, or the like. In at least one of the various embodiments, client applications may receive and/or generate data related to data models and may generate tables and relationships between and among the data. In at least one of the various embodiments, client computers 101-104 may view and/or modify generated data models.

Wireless network 110 is configured to couple client computers 102-104 and its components with network 111. Wireless network 110 may include any of a variety of wireless sub-networks that may further overlay stand-alone ad-hoc networks, or the like, to provide an infrastructure-oriented connection for client computers 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, 5G, and future access networks may enable wide area coverage for mobile devices, such as client computers 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), High Speed Downlink Packet Access (HSDPA), Long Term Evolution (LTE), or the like. In essence, wireless network 110 may include virtually any wireless communication mechanism by which information may travel between client computers 102-104 and another computing device, network, or the like.

Network 111 is configured to couple network computers with other computing devices, including, modeling platform server computer 107, client computer(s) 101, and through wireless network 110 to client computers 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, processor-readable storage devices described in more detail below.

Figure 3:
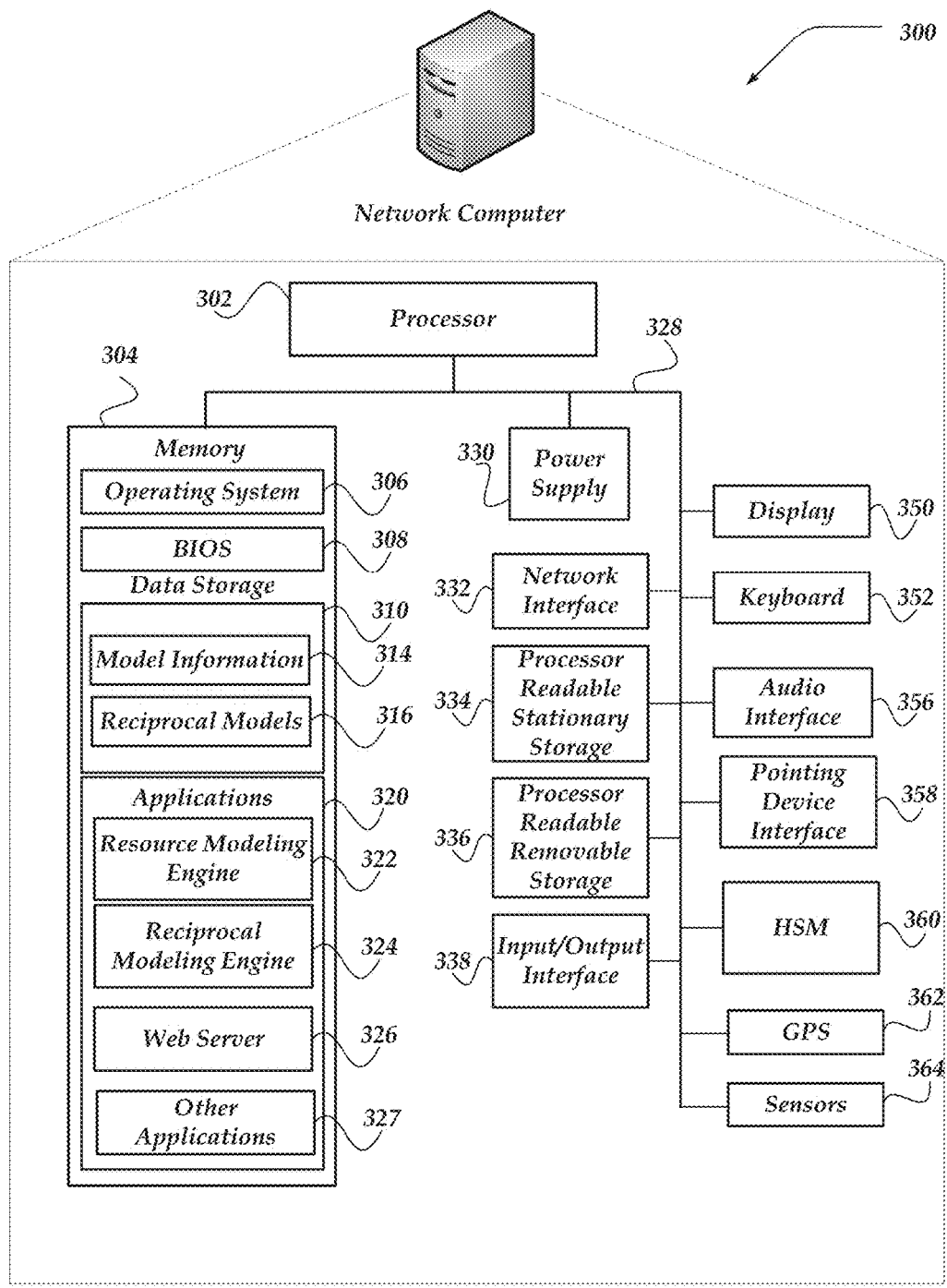
FIG. 3 illustrates one embodiment of a network computer that may be included in a system.

Modeling platform server computer 107 may include virtually any network computer usable to perform data processing operation that may be used for generating data models, allocation rules, recursive allocation rules, resource allocations, displays and/or reports thereof, such as network computer 300 of FIG. 3. In at least one of the various embodiments, modeling platform server computer 107 employs various techniques to create, define, generate, automated data processing applications for resource planning. Modeling platform server computer 107 may include modules for generating data processing applications that may provide and apply data models that may include dataset templates, category templates, allocation rules, recursive allocation rules or the like. Furthermore, modeling platform server computer 107 may include and/or generate data processing applications for visualizing the generated resource allocations, data models, reciprocal models, allocation rules, recursive allocation rules, or the like.

Devices that may operate as modeling platform server computer 107 include various network computers, including, but not limited to personal computers, desktop computers, multiprocessor systems, microprocessor-based or programmable consumer electronics, network PCs, server devices, tablet computers, network appliances, or the like. It should be noted that while modeling platform server computer 107 is illustrated as a single network computer, the invention is not so limited. Thus, in another embodiment, modeling platform server computer 107 may represent a plurality of network computers. For example, in at least one of the various embodiments, modeling platform server computer 107 may be distributed over a plurality of network computers and/or implemented using cloud architecture.

Moreover, modeling platform server computer 107 is not limited to a particular configuration. Rather, modeling platform server computer 107 may operate using a controller/worker approach over a plurality of network computers, within a cluster, a peer-to-peer architecture, cloud-based architecture (e.g., virtual machines), and/or any of a variety of other architectures. Thus, modeling platform server computer 107 is not to be construed as being limited to a single environment, and other configurations, and architectures are also envisaged. modeling platform server computer 107 may employ processes and architectures described below to perform at least some of its actions.

Illustrative Client computer

Figure 2:
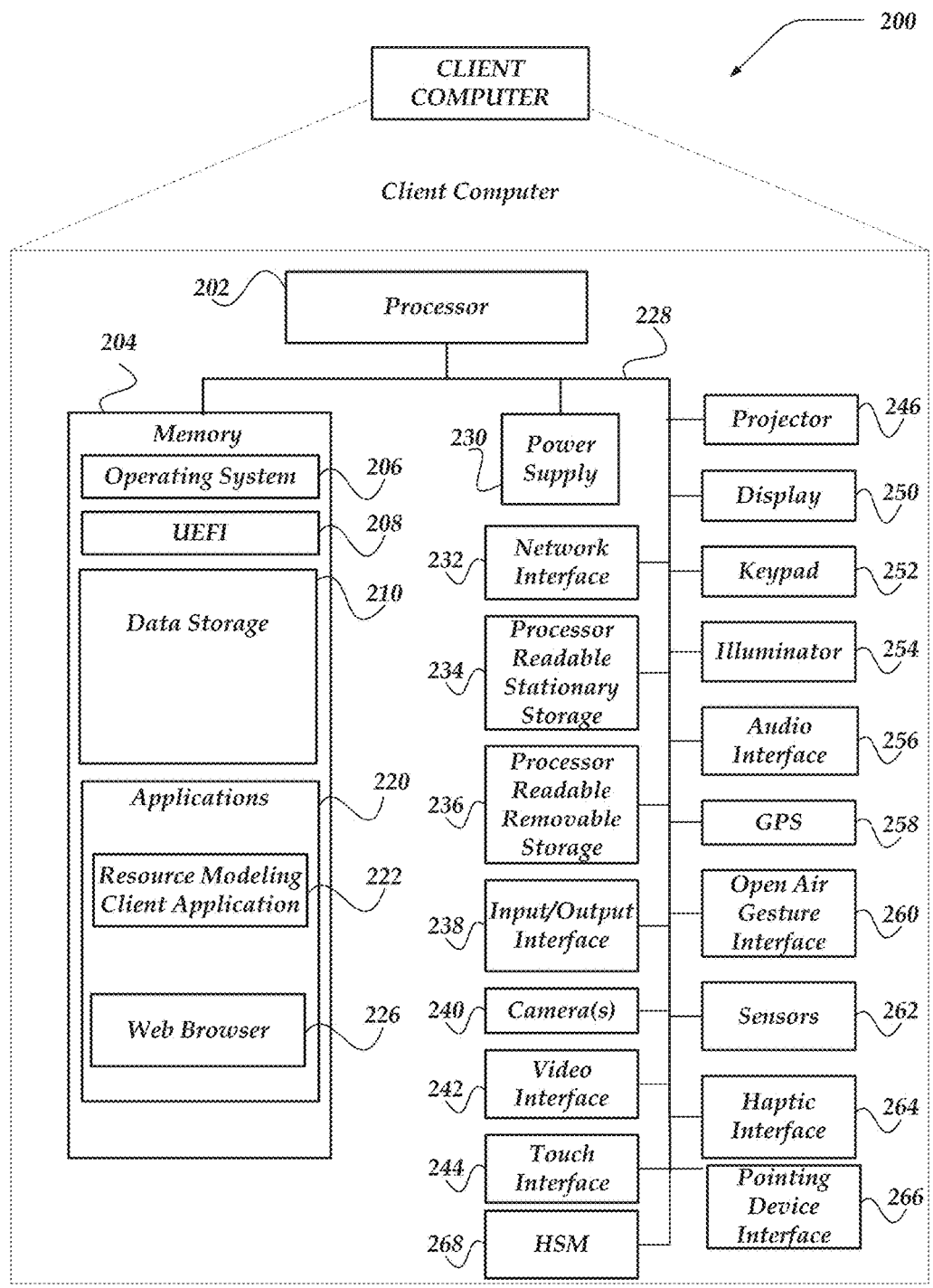
FIG. 2 shows one embodiment of a client computer that may be included in a system.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like. Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In at least one of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect and/or measure data that is external to client computer 200

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

In at least one of the various embodiments, applications, such as, resource modeling client application 222, web browser 226, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 258. Also, in some embodiments, geolocation information may include information provided using one or more geolocation protocols over the networks, such as, wireless network 108 and/or network 111.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store Unified Extensible Firmware Interface (UEFI) 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™. The operating system may include, or interface with a Java and/or JavaScript virtual machine modules that enable control of hardware components and/or operating system operations via Java application programs or JavaScript programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, resource modeling client application 222. In at least one of the various embodiments, resource modeling client application 222 may be used to exchange communications to and from modeling platform server computer 107, including, but not limited to, queries, searches, API calls, configuration information, or the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of one or more CPUs, such as, an Application Specific Integrated Circuits (ASICs), Field Programmable Gate Arrays (FPGAs), Programmable Array Logic (PAL), or the like, or combination thereof. The embedded logic hardware devices may directly execute embedded logic to perform actions. Also, in one or more embodiments (not shown in the figures), the client computer may include one or more hardware microcontrollers instead of one or more CPUs. In at least one embodiment, the microcontrollers be system-on-a-chips (SOCs) that may directly execute their own embedded logic to perform actions and access their own internal memory and their own external Input and Output Interfaces (e.g., hardware pins and/or wireless transceivers) to perform actions.

Illustrative Network Computer

FIG. 3 shows one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of modeling platform server computer 107 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect and/or measure data that is external to network computer 300

In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data model information 314, reciprocal model information 316, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include resource modeling engine 322, reciprocal modeling engine 324, web server application 326, other applications 327, or the like, that may perform actions further described below. In at least one of the various embodiments, one or more of the applications may be implemented as modules and/or components of another application. Further, in at least one of the various embodiments, applications may be implemented as operating system extensions, modules, plugins, or the like.

In at least one of the various embodiments, applications, such as, resource modeling engine 322, reciprocal modeling engine 324, web server application 326, other applications 327, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 362. Also, in some embodiments, geolocation information may include information provided using one or more geolocation protocols over the networks, such as, wireless network 108 and/or network 111.

Furthermore, in at least one of the various embodiments, resource modeling engine 322 and reciprocal modeling engine 324 may be operative in a cloud-based computing environment. In at least one of the various embodiments, these engines, and others, that comprise the modeling platform that may be executing within virtual machines and/or virtual servers that may be managed in a cloud-based based computing environment. In at least one of the various embodiments, in this context applications including the engines may flow from one physical network computer within the cloud-based environment to another depending on performance and scaling considerations automatically managed by the cloud computing environment. Likewise, in at least one of the various embodiments, virtual machines and/or virtual servers dedicated to resource modeling engine 322 and/or reciprocal modeling engine 324 may be provisioned and de-commissioned automatically.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be arranged as a hardware card that may be installed in a network computer.

Additionally, in one or more embodiments (not shown in the figures), network computer 300 may include an one or more embedded logic hardware devices instead of one or more CPUs, such as, Application Specific Integrated Circuits (ASICs), Field Programmable Gate Arrays (FPGAs), Programmable Array Logic (PALs), or the like, or combination thereof. The one or more embedded logic hardware devices may directly execute its embedded logic to perform actions. Also, in one or more embodiments (not shown in the figures), the network computer may include one or more hardware microcontrollers instead of one or more CPUs. In at least one embodiment, the one or more microcontrollers may directly execute embedded logic to perform actions and access their own internal memory and their own external Input and Output Interfaces (e.g., hardware pins and/or wireless transceivers) to perform actions. E.g., they may be arranged as Systems On Chips (SOCs).

In at least one of the various embodiments, resource modeling engine 322 and reciprocal modeling engine 324 may enable a user to generate project plans, allocation rules, data models, reports, what-if-analysis, or the like. Also in at least one of the various embodiments, resource modeling engine 322 and/or reciprocal modeling engine 324 may employ processes, or parts of processes, similar to those described below.

Illustrative Logical System Architecture

Figure 4:
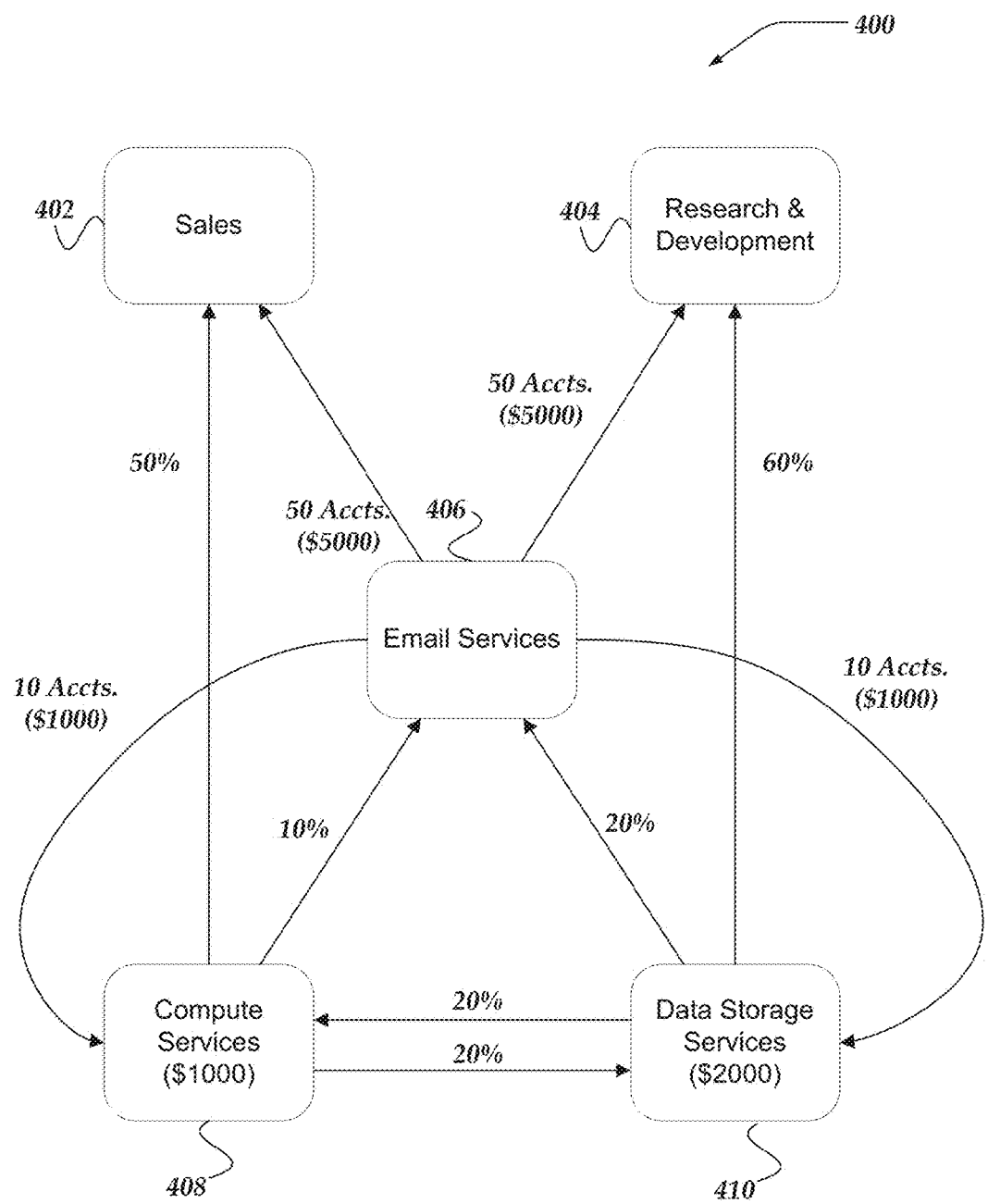
FIG. 4 illustrates a portion of a logical architecture for a data model that illustrates how resources may be allocated in a data model in accordance with at least one of the various embodiments.

FIG. 4 illustrates a portion of a logical architecture for data model 400 that illustrates how resources may be allocated in a data model in accordance with at least one of the various embodiments. Data model 400 is an example of a data model that may be arranged to model how resources, such as, services, products, supplies, money, energy, labor, power, or the like, flow through a system and/or organization. Data model 400 is a simplified example that is used to describe some the concepts of the innovations included herein. One of ordinary skill in the art will appreciate that in practice data models may include hundreds or thousands of model objects that be representing millions of model items.

In this example, data model 400 may be arranged to include sales object 402, research and development (R & D) object 404, email services 406, compute services object 408, and data storage services object 410. The objects in the data model represent how money from resources in a business system may be distributed. Further, allocation rules, shown as the edged in data model 400, may be defined to how resources may be distributed from one model object to another, Assignment rules may be arranged to describe how resources may be allocated from one model object to another in a data model. In some embodiments, since model objects may be comprised of model line items, the allocation rules may be arranged to describe how resources flow from one model object in a data model to another based on the source objects' model line items.

In at least one of the various embodiments, data model 400 shows that sales object 402 may be allocated 50% of the resource outlays for compute object 408. Likewise, data model 400 shows that sales object 402 is also allocated 50 email accounts from email services object 406. Further, data model 400 shows that R & D object 404 is allocated 60% of the resources from storage object 410 and 50 email accounts from email services object 406. Also, data model 400 shows that compute object 408 allocates 20% of its resources to data storage object 410 while similarly data storage object 410 allocates 20% of its resources to compute object 408. Finally, in this example, data model 400 shows that email services object 406 allocates 50 email accounts to sales object 402, 50 email accounts to R & D object 404, 10 email accounts to compute object 408, and 20 email accounts to data storage object 410. Likewise, email services object 406 is allocated 10% of resources from compute object 408 and 10% of resources from data storage object 410.

Further, in this example, compute object 408 begins with an initial (fixed) allocation charging it $1000 while data storage object 410 has an initial (fixed) allocation of charging it $2000. In this example, for some embodiments, these values represent resources allocated to compute object 408 and data storage object 410 from outside of data model 400. Accordingly, these resources may be flowing into data model 400 from other model objects and/or data model portions not shown and for the purpose of this description are not considered part of data model 400. For example, in some embodiments, a General Ledger object or other funding source object not shown here may be charging for the resources for compute object 408 and data storage object 410 may consume, such as, power, rent, or the like.

Accordingly, in at least one of the various embodiments, data models, such as, data model 400 may be intended to enable reports to be generated that answer various questions about how resources are allocated throughout the modeled business system. Accordingly, in some embodiments, users may expect data model 400 to enable reports that shows the specific resource amounts that are allocated among the model objects. This may be used for various business purposes, such as, resource budgeting, resource planning, resource forecasting, monitoring actual resources allocation (actuals vs. planned), or the like, or combination thereof.

Accordingly, in at least one of the various embodiments, the information necessary for providing the specific allocation values for each object may be included in data model 400. However, some specific allocation values may not be readily apparent from data model 400.

One of ordinary skill in the art will appreciate that data models may be arranged in different geometries and have more (many more) or fewer model objects depending on the application and/or the business system being modeled. Also, in some embodiments, data models may be arranged to model the allocation of different resources, such as, financial resources (money), energy, water, power, or the like, or combination thereof, among different parts of an enterprise or organization.

In at least one of the various embodiments, model objects may be classified as pass-through objects or priced objects. In some embodiments, pass-through objects may be arranged to represent entities that may be required to pass on their resource costs to the one or more model objects that consume resources provided be the pass-through object. Accordingly, in at least one of the various embodiments, pass-through objects may represent business units that are expected to pass all of their costs on to the other business units that they support. In other words, pass-through objects may represent organizations/entities that are not supposed to make a profit or experience losses. Thus, for example, if compute object 408 is a pass-through object, it should pass all of its resource costs to its consumers. In this example, compute object 408 has to pass through its costs to sales object 402, email services 406, and data storage object 408.

In contrast, in at least one of the various embodiments, some model objects may be arranged to be priced objects. In some embodiments, priced objects may be arranged to set a defined price for the services/goods they may provide to other entities in the business. For example, in data model 400, email services object 406 may be considered a priced object. Accordingly, the business unit that provides email services may be considered to charge a fixed priced for each email account they provide to other business units. Thus, business units that may be represented by priced objects may run profits or losses depending on business policy.

Accordingly, in this example, for some embodiments, the price per email account may be set at $100. Thus, the ten email accounts provided to compute object 408 result in a $1000 charge against that object. Likewise, in this example, the ten email accounts provided to data storage object 410 results in a $1000 charge to data storage object 410. Also, sale object 402 may be charged $5000 for its 50 email accounts and R & D object 404 may be charged $5000 for its 50 email accounts.

Figure 5:
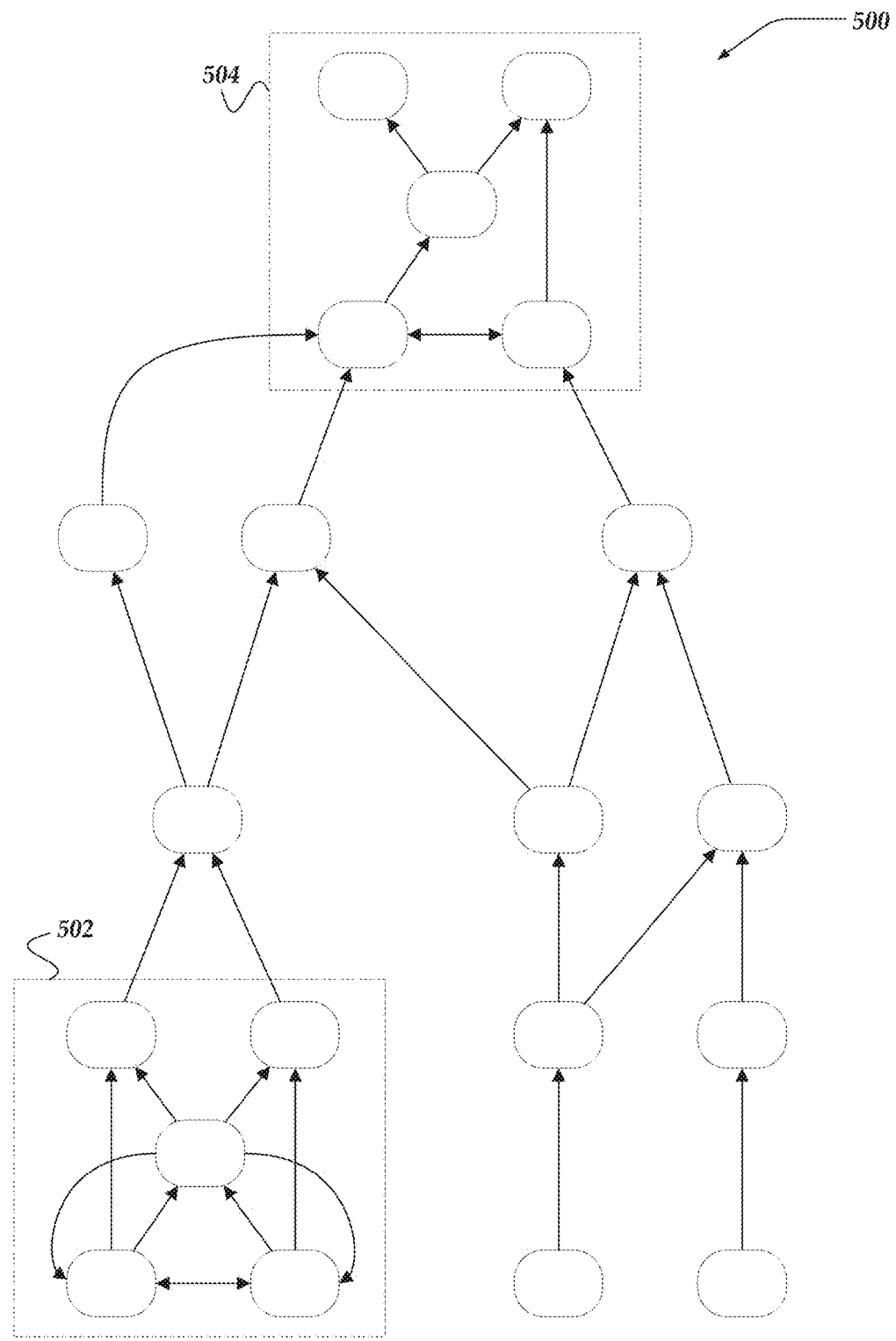
FIG. 5 illustrates a logical architecture for a data model in accordance with at least one the various embodiments.

FIG. 5 illustrates a logical architecture for data model 500 in accordance with at least one the various embodiments. In at least one of the various embodiments, data models, such as, data model 500 may be partitioned in smaller data models. For example, model portion 502 may represent a portion of data model 500. Accordingly, for this example, model portion 502 may correspond to data model 400 in FIG. 4.

In at least one of the various embodiments, partitioning a larger data model into smaller data models may enable improved performance by reducing the number of computations one or more hardware processors may have to perform. In some embodiments, a data model may include thousands of model objects representing millions of model line items. Accordingly, for sufficiently large data models partitioning may be employed break up a expensive larger computational problem into smaller problems. In at least one of the various embodiments, various threshold values may be defined to determine if a data model may be partitioned into smaller data models. In some embodiments, such threshold values may be defined in configuration information and/or rules that may be applied. For example, in some embodiments, if a defined threshold value is exceeded by the number of model objects in a data model it may trigger model partitioning. Likewise, in some embodiments, a threshold duration value may be defined such that if a duration to perform one or more particular data model operations exceeds the defined threshold, it may trigger partitioning. In at least one of the various embodiments, if one or more partitioning conditions are met, automatic partitioning may occur or alternatively notifications may be provided to users indicating that partitioning may be recommended.

In at least one of the various embodiments, a resource modeling engine, such as, resource modeling engine 322 may be arranged to execute various well-known graph partitioning strategies to partition a data model as needed. In some embodiments, the particular partitioning strategy may be selected based on configuration information, user input, or the like, or combination thereof.

Figure 6:
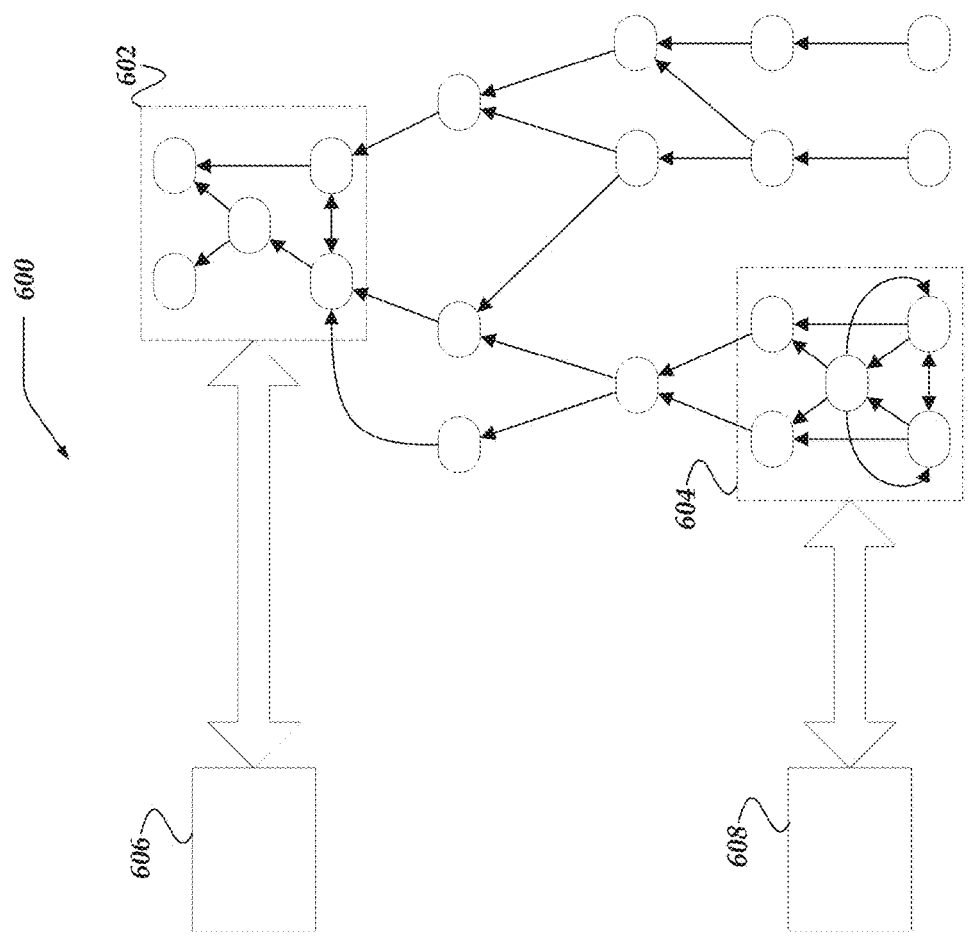
FIG. 6 illustrates a logical architecture of a data model in accordance with at least one of the various embodiments.

FIG. 6 illustrates a logical architecture of data model 600 in accordance with at least one of the various embodiments. As described above, in some embodiments, data models, such as, data model 600 may be partitioned into small data models. In this example, data model portion 602 and data model portion 606 may be portions of data model 600 that may be partitioned from the larger data model 600.

In at least one of the various embodiments, candidates for partitioning may include portions of data model 600 that may include pass-through objects (e.g., portion 602 and portion 604). Accordingly, in at least one of the various embodiments, a resource modeling engine, such as, resource modeling engine 322 may be arranged generate separate reciprocal models for these partitions.

Accordingly, in at least one of the various embodiments, the separate reciprocal models may be processed by an reciprocal model engine, such as, reciprocal model engine 324 to compute resource allocation information for the model objects included data model partitions separately from computation performed in using the larger data model. In some embodiments, results produced by the reciprocal model engines may be provided by resource modeling engine 324 to associate with model objects in the parent data model, here data model 600.

In at least one of the various embodiments, a data model, such as, data model 600 may be employed to provide visualization of the flow of resources through a modeled business system. Whereas, in some embodiments, one or more reciprocal data models may be hidden from view and otherwise not shown in the visualizations of data models, such as, data model 600. However, in some embodiments, even though one or more reciprocal models may be hidden from view, the allocation values and/or resource costs provided by the one or more reciprocal models may be incorporated and/or displayed in the data model.

Figure 7:
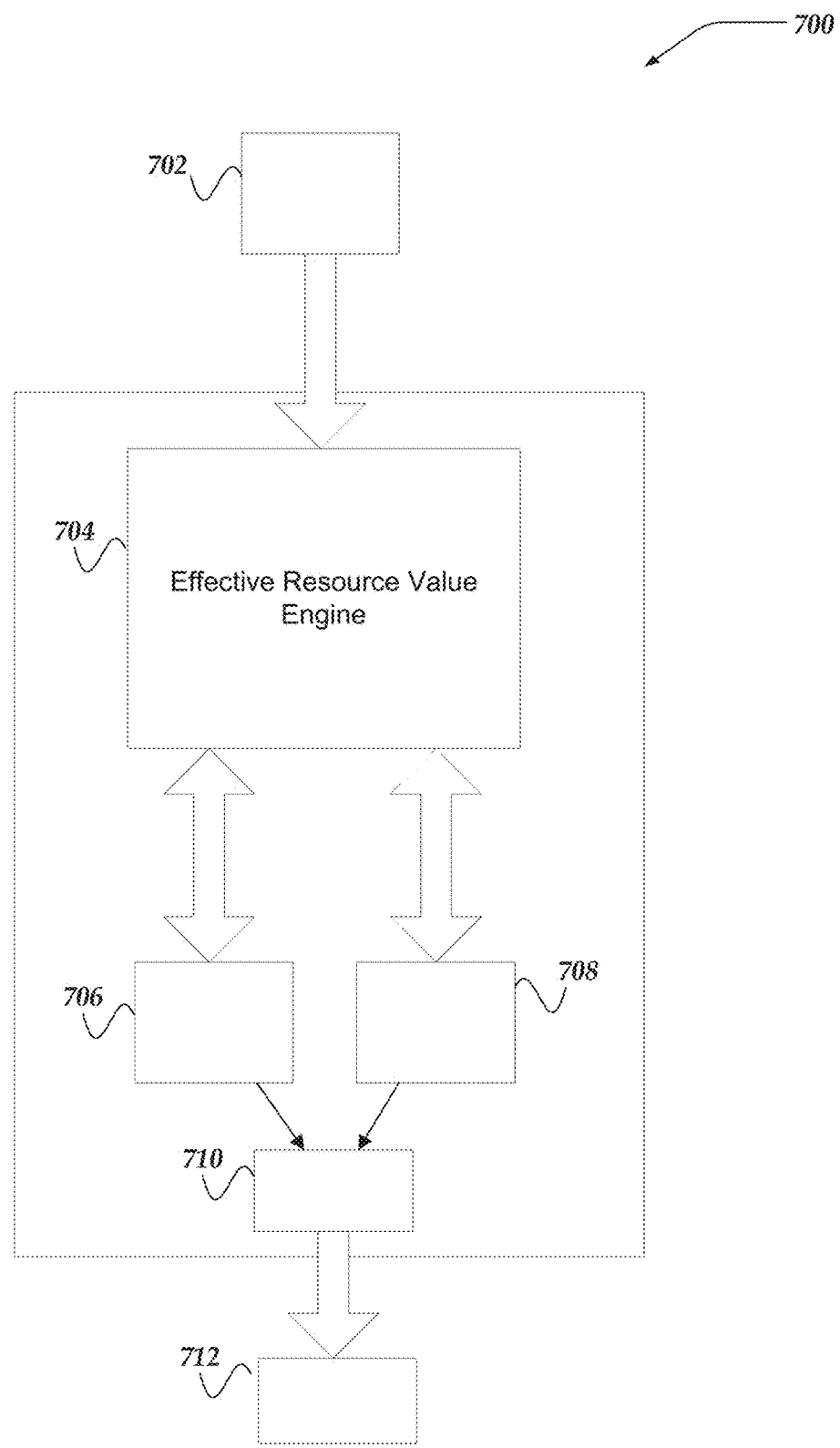
FIG. 7 illustrates a logical architecture of a reciprocal model in accordance with at least one of the various embodiments.

FIG. 7 illustrates a logical architecture of reciprocal model 700 in accordance with at least one of the various embodiments. In at least one of the various embodiments, reciprocal models may be generated for data models and/or data model portions that include one or more pass-through objects.

In at least one of the various embodiments, reciprocal model 700 may be provided input 702 that include various input data associated with a business system. In some embodiments, input 702 may include various resource allocation information derived and/or provided by a data model. For example, input 702 may include fixed value resource allocations, priced based resources allocations, resource costs, or the like, or combination thereof, associated with the model objects that reciprocal model 700 represents.

In at least one of the various embodiments, effective resource value engine 704 may be arranged to receive one or more of the inputs and provide one or more effective resource values for the pass-through objects represented in reciprocal model 700. In at least one of the various embodiments, effective resource value engine 704 may be configured and arranged by a reciprocal modeling engine that may generate a specific effective resource value engine for computing the effective resource values for one or more pass-through objects that are modeled by reciprocal model 700.

In at least one of the various embodiments, resource allocation information for priced objects 706 and resource allocation information for final object 708 may be generated based in part on the value produced by effective resource value engine 704.

In at least one of the various embodiments, the resource allocation information for the pass-through objects, priced objects, and final objects included in the data model (or data model portion) represented by reciprocal model 700 may be organized for output. In at least one of the various embodiments, such organizations may include associating the generated resource allocation information with its corresponding model objects in a form that may be compatible with a data model and/or data model visualization model.

In at least one of the various embodiments, output information 712 may be provided back to resource modeling engine that may add it to a data model.

Figure 8:
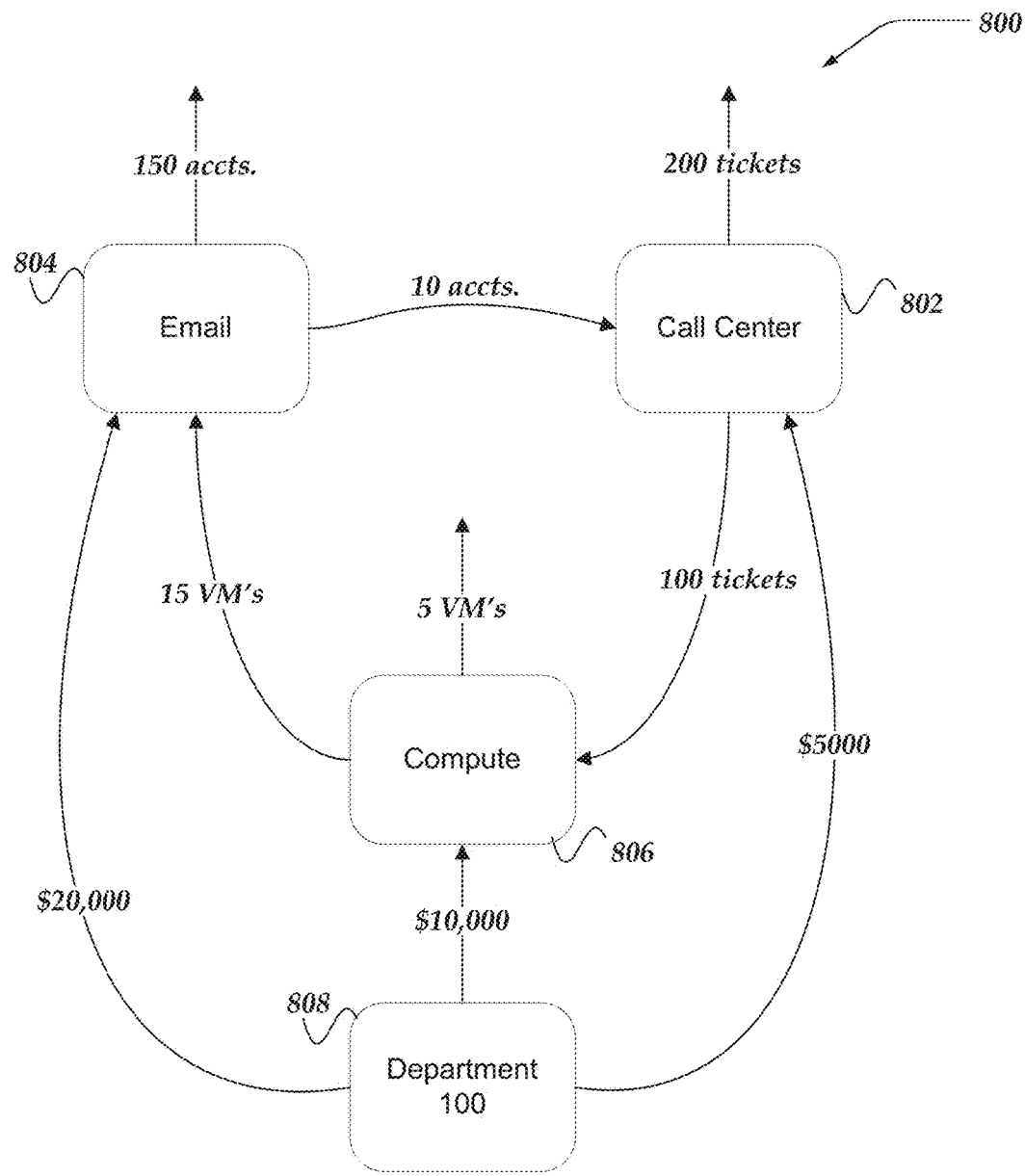
FIG. 8 illustrates a portion of a logical architecture for a data model that illustrates how resources may be allocated in a data model in accordance with at least one of the various embodiments.

FIG. 8 illustrates a portion of a logical architecture for data model 800 that illustrates how resources may be allocated in a data model in accordance with at least one of the various embodiments. Data model 800 is an example of a data model that may be arranged to model how resources, such as, services, products, supplies, money, energy, labor, power, or the like, flow through a system and/or organization. Data model 800 is a simplified example that is used to describe some the concepts of the innovations included herein. One of ordinary skill in the art will appreciate that in practice data models may include hundreds or thousands of model objects that be representing millions of model items. Data model 800 represents one or more embodiments used here to describe the data structures used to efficiently implement the computational solution to improve to performance and operation of computer for resource allocation.

In at least one of the various embodiments, data model 800 is similar to data model 400 described above. In this example, data model 800 includes four model objects, call center object 802, email object 804, compute object 806, and department object 808. Similar to data model 400, call center object 802 represents a call center business unit for an organization; email object 804 represents an email service business unit; compute object 806 represents a compute (e.g., cloud computing and/or on-premises data center) services business unit in an organization; and department object 808 represent a non-IT related business unit that may allocated resource costs to other model object in data model 800.

In this example, data model 800 may be analyzed for determining the resource allocations for email object 804, compute object 806, and call center object 802, which are pass-through objects. In this example, department object 808 may be allocating resources to all these other business units provided fixed resource value s for email object 804, compute object 806, and call center object 802.

In this example, most business unit are allocating some resource units outside of the set of pass-through objects. For example, email is shown allocating 150 accounts outside of data model 800. These allocations may be important, as they may alter the percentages in the linear system used in the reciprocal model.

In this example, for some embodiments, in FIG. 8, the edges of data model 800 are annotated with the resource values that are provided by a given business unit. For example, data model 800 shows that department object 808 allocates $10,000 to compute object 806; department object 808 allocates $20,000 to email object 804; department object 808 allocates $5,000 to call center object 802; call center object 802 allocates/provides 100 service tickets to compute object 806; call center object 802 allocates/provides 200 tickets to objects outside of data model 800; compute object 806 allocates/provides 15 virtual machines (VMs) to email object 804; computer object 806 allocates/provides 5 VMs to model objects (e.g., business units) outside of data model 800; email object 804 allocates/provides 10 email accounts to call center object 802; and email object 804 allocates/provides 150 email accounts to model object outside of data model 800.

In this example, a reciprocal modeling engine, such as, reciprocal modeling engine 324 may be arranged to provide a reciprocal model to determine the resource costs for the pass-through objects (e.g., email object 804, compute object 806, and call center object 802), given their fixed costs (e.g., as provided by department object 808) and recursive allocation dependencies.

As described above, a reciprocal modeling engine, such as, reciprocal modeling engine 324 may be arranged to generate an effective resource value engine based on a linear system that finds email object 804 (E), compute object 806 (C), and call center object 802 (Call) costs, such that the following equalities are simultaneously correct:

1) $E = 20000 + 15/20 * C$ (as only 15 of the total 20 VMs offered by C are going to E)

2) $Call = 5000 + 10/160 * E$ (as only 10 of the total of 160 accounts from E are going to Call)

3) $C = 10000 + 100/300 * Call$ (as only 100 of the total of 300 tickets from Call are going to C)

In at least one of the various embodiments, reciprocal modeling engine 324 may be arranged to generate a reciprocal model from a portion of a larger data model. See, FIG. 12 for detailed operations.

Figure 9A:
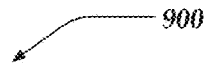
Figure 9B:
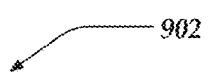
Figure 9C:
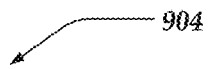

FIGS. 9A-9F illustrate data structures configured and arranged to improve support allocating resources using reciprocal models in accordance with at least one of the various embodiments. FIG. 9A represents list 900 that includes allocation information corresponding to data model 800. FIG. 9B represents vector 902 for tracking allocations to pass-through objects. And, FIG. 9C represents vector 904 for tracking allocations of fixed resource values to pass-through objects. FIG. 9D illustrates matrix 906 (matrix A) and vector 908 (vector B) initialized for generating reciprocal models. FIG. 9E illustrates matrix 910 (matrix A) and vector 912 (vector B) that include the resource allocation information for a reciprocal model. And, FIG. 9F illustrates non-transitory computer readable media (e.g., memory) arranged and configured to represent the matrix and vector for a reciprocal model. In this example, media 914 is represented as having 8-bytes words (64-bit) and addressed using word-based relative addressing. Similarly, for some embodiments, media 916 may be 8-bit wide and using byte level relative addresses where it may be assumed that for this example, 64-bits is used to store the values. One of ordinary skill in the will appreciate that media 914 and media 916 may be arranged somewhat differently depending on the underlying architecture of the one or more processor and/or memory architecture. For example, big-endian vs. little-endian, or the like. Also, there may be additional parity and/or error protection bits/bytes (omitted for brevity and clarity) included in media 914 and media 916 that may vary depending on the hardware architecture of the underlying memory. FIG. 9A-9F may be referenced below in conjunction with describing one or more of the processes for resource allocation using reciprocal models.

Generalized Operations

FIGS. 10-16 represent the generalized operations for recursive allocation in accordance with at least one of the various embodiments. In at least one of the various embodiments, processes 1000, 1100, 1200, 1300, 1400, 1500, and 1600 described in conjunction with FIGS. 10-16 may be implemented by and/or executed on a single network computer, such as network computer 300 of FIG. 3. In other embodiments, these processes or portions thereof may be implemented by and/or executed on a plurality of network computers, such as network computer 300 of FIG. 3. However, embodiments are not so limited, and various combinations of network computers, client computers, virtual machines, or the like may be utilized. Further, in at least one of the various embodiments, the processes described in conjunction with FIGS. 10-16 may be operative in resource modeling and recursive resource allocation architectures such as those described in conjunction with FIGS. 4-9.

Figure 10:
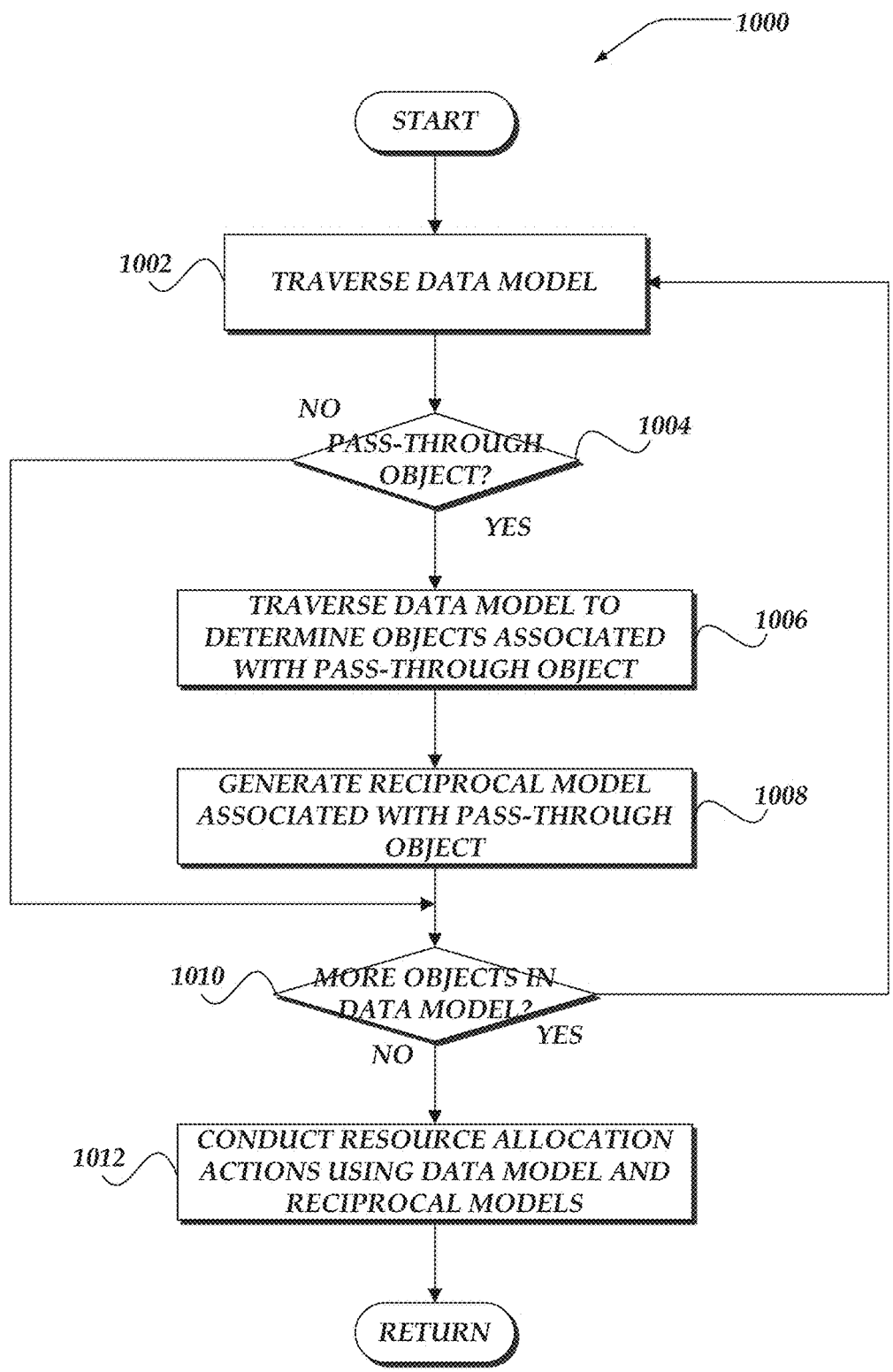
FIG. 10 illustrates an overview flowchart for a process for resource allocation in accordance with at least one of the various embodiments.

FIG. 10 illustrates an overview flowchart for process 1000 for recursive resource allocation in accordance with at least one of the various embodiments. After a start block, at block 1002, in at least one of the various embodiments, process 1000 may begin traversal of a data model. In at least one of the various embodiments, a resource modeling engine, such as, resource modeling engine 322, may be arranged to traverse the nodes of data model. In at least one of the various embodiments, each encountered model object may be checked to determine if it may be a pass-through object that may qualify to be added to a reciprocal model.

At decision block 1004, in at least one of the various embodiments, if a pass-through object is reached during traversal, control may flow to block 1006; otherwise, control may flow to decision block 1010. In at least one of the various embodiments, pass-through objects may be identified based on meta-data that may be associated with the model object. Also, in some embodiments, additional criteria may be assigned for determining if a model object may be considered a pass-through for the purpose of reciprocal modeling.

At block 1006, in at least one of the various embodiments, the traversal may change to a explorer/discovery mode to identify other model objects, including other pass-through objects that may be associated with the pass-through object that was discovered at decision block 1004. In at least one of the various embodiments, one or more graph exploration traversal methods may be executed to identify one or more other model objects that may be included in a reciprocal model.

At block 1008, in at least one of the various embodiments, a reciprocal model may be generated based on the one or more model objects encountered during the exploratory traverse centered around the pass-through object encountered described at decision block 1010.

At decision block 1010, in at least one of the various embodiments, if model objects in the data model still need to be traversed, control may loop back to block 1002 so the traversal of the entire data model may continue; otherwise, control may flow to block 1012.

At block 1012, in at least one of the various embodiments, resource allocation actions may be performed using the data model and the one or more reciprocal models. In at least one of the various embodiments, such actions may include, visualization of resource allocations, reporting, resource budgeting, resource forecasting, or the like, or combination thereof. Next, control may be returned to a calling process.

In at least one of the various embodiments, a reciprocal modeling engine, such as, resource modeling engine 322 or other application may be arranged to present a user-interface that enables a user to select one or more pass-through object to include in a reciprocal model or exclude from reciprocal modeling. Likewise, in at least one of the various embodiments, the user-interface may be arranged to enable a user to select one or more other model objects to include in a reciprocal model or exclude from a reciprocal model.

Figure 11:
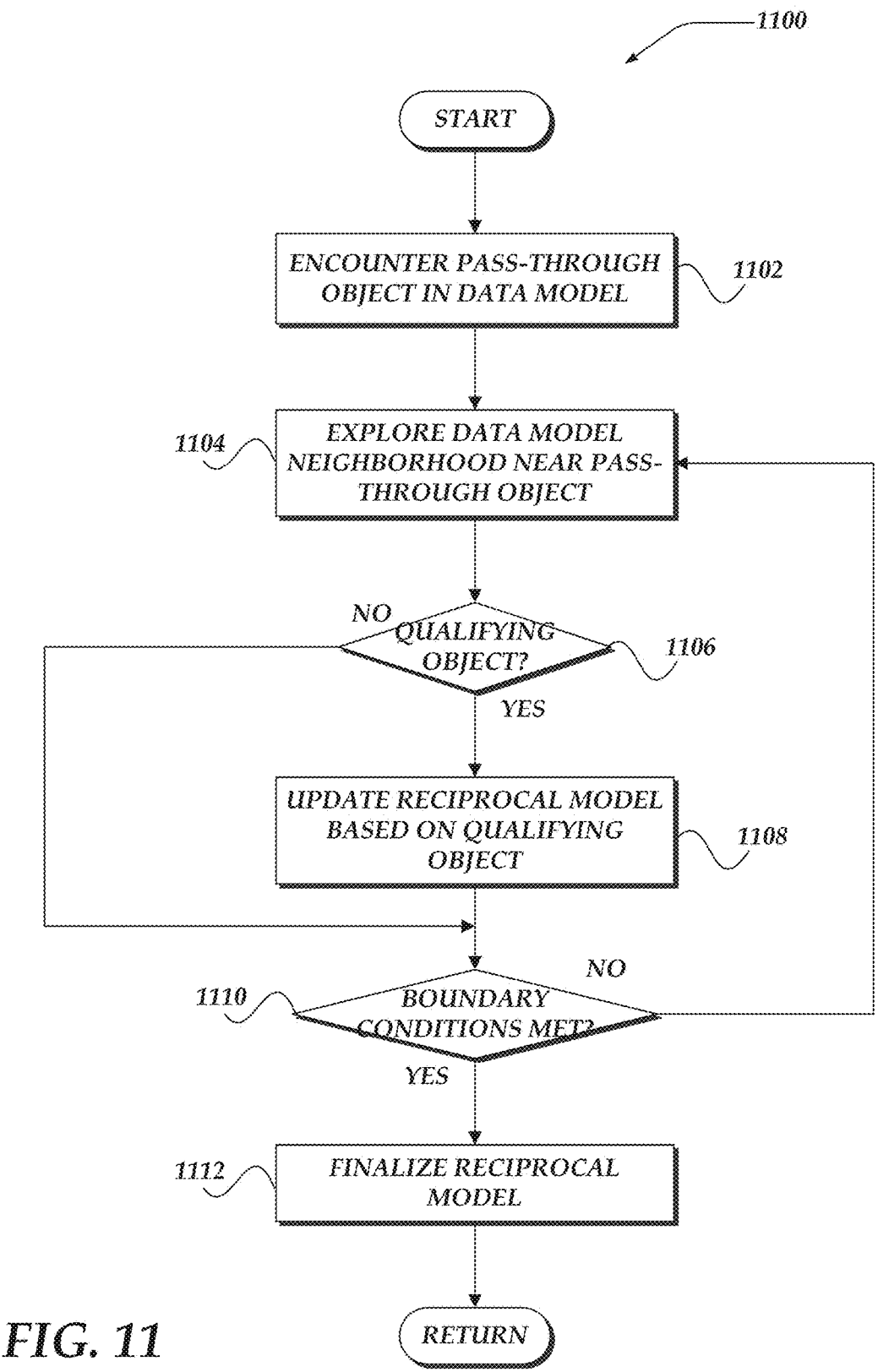
FIG. 11 illustrates a flowchart for a process for traversing a data model to identify model objects for a reciprocal model in accordance with at least one of the various embodiments.

FIG. 11 illustrates a flowchart for process 1100 for traversing a data model to identify model objects for a reciprocal model in accordance with at least one of the various embodiments. After a start block, at block 1102, in at least one of the various embodiments, a pass-through object in a data model may be located in a data model. As described above, the pass-through may be encountered during a traversal of the data model. Likewise, in some embodiments, a user may be enabled to select a pass-through object from the data model.

At block 1104, in at least one of the various embodiments, the data model neighborhood that may be near the pass-through object may be explored. In at least one of the various embodiments, one or more graph exploration traversal may be conducted. In at least one of the various embodiments, the exploration may be arranged to identify other model objects in the data model that may be included in a reciprocal model that may be associated with the pass-through object.

At decision block 1106, in at least one of the various embodiments, if a qualifying object may be discovered, control may flow to block 1106; otherwise, control may flow to decision block 910. In at least one of the various embodiments, qualifying objects may include other model objects, such as, pass-through objects, priced objects, source objects, final objects, or the like, that may be associated with the pass-through object encountered at block 1102.

In at least one of the various embodiments, the specific criteria for selecting a qualified model object may be defined in configuration information. For example, configuration information may define that if a model object is another pass-through object that allocates resources to the pass-through object of interest, that other pass-through object may be qualified. Likewise, in some embodiments, other model objects that allocate resources to the pass-through object of interest may be considered qualified.

At block 1108, in at least one of the various embodiments, a reciprocal model may be updated based on the discovered qualifying object. In at least one of the various embodiments, the qualifying model object may be tagged or otherwise identified as being associated with the reciprocal model. Accordingly, the qualifying model objects may be excluded from direct resource allocation actions performed in the data model. Otherwise, in at least one of the various embodiments, the qualified model objects may be processed in the data model as well as in the reciprocal model.

At decision block 1110, in at least one of the various embodiments, if one or more boundary conditions are met, control may flow to block 1112; otherwise, control may loop back to block 1104. In at least one of the various embodiments, specific boundary conditions may be defined in configuration information. For example, one boundary condition may be that an expanding set of model objects in the data model may be traversed until the model objects that may allocate resources to one or more of the pass-through objects included in the reciprocal model have been identified. Likewise, in some embodiments, other boundary conditions may include exploring until each model object that is allocated resources from one or more of pass-through object included in the reciprocal model may be identified.

At block 1112, in at least one of the various embodiments, the reciprocal model may be finalized. In at least one of the various embodiments, a reciprocal modeling engine, such as, reciprocal modeling engine 324, may be arranged to perform various operations to finalize the reciprocal model so it may be ready to use for providing allocation information to its parent data model. In some embodiments, finalizing the reciprocal model may include generating an effective resource value engine for the reciprocal model, or the like. Likewise, in at least one of the various embodiments, finalizing actions may include compacting the reciprocal model for more efficient in-memory representation, or the like. In at least one of the various embodiments, some finalization actions may be performed in conjunction with other actions in process 1100, rather than just occurring at block 1112. Next, control may be returned to calling process.

Figure 12:
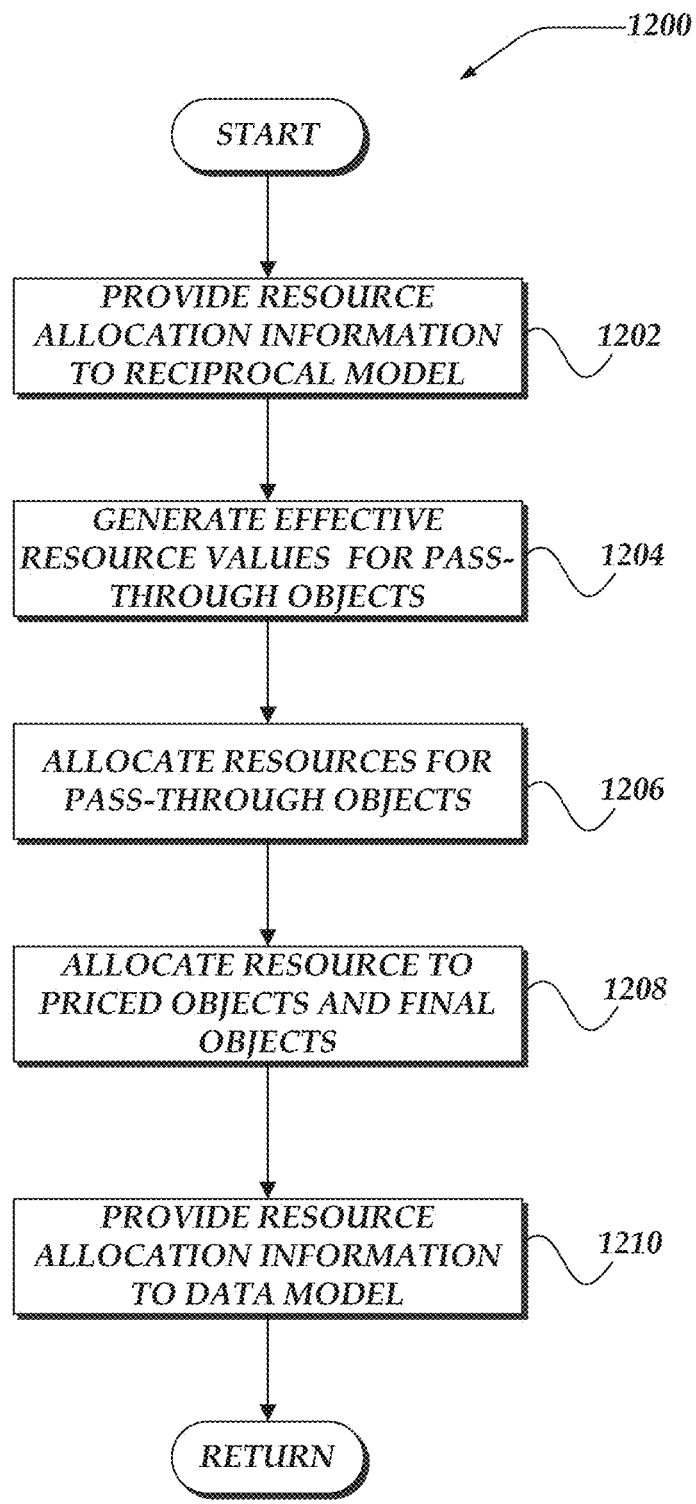
FIG. 12 illustrates a flowchart for a process for performing resource allocation using a reciprocal model in accordance with at least one of the various embodiments.

FIG. 12 illustrates a flowchart for process 1200 for performing resource allocation using a reciprocal model in accordance with at least one of the various embodiments. After a start block, at block 1202, in at least one of the various embodiments, resource allocation information may be provided to a reciprocal model. In at least one of the various embodiments, values, such as, fixed costs, allocation rule information, or the like.

At block 1204, in at least one of the various embodiments, effective resource values for the pass-through objects may be generated. In at least one of the various embodiments, a linear system may be provided and solved to determine effective resource values for the one or more pass-through objects that are associated with the reciprocal model.

In at least one of the various embodiments, the linear system may be described as:

$$\{X_i A_i + \Sigma X_1 * A_{i,j}\}$$

Where:

$X_i$—may be the total effective resource value (unknown) for each pass-through object.

$A_{i,j}$—may be the percentage of service units offered by provider J to consumer I This coefficient is non-null if J is a pass-through object that provides resources to other objects.

This percentage may be computed as the ratio between the number of resource units where J is provider and I is consumer and the total number of service units where J is the provider.

$A_j$—may be the fixed cost associated with model object J. This is computed by summing the following:

Any direct resource allocation (resources costs where the provider and the consumer are both object J).

Any priced services allocated to object J (computed via the P*Q method, by multiplying the quantity of units allocated to consumer object J with the price per unit of the provider object.

Any source object resource costs allocated to object J (from one or more source provider objects.)

In at least one of the various embodiments, the linear system engine may be arranged to employ one or more numerical processing software libraries, such as, NumPy, LAPACK, Intel Math Kernel Library (Intel MKL), GNU Scientific Library, or the like, for solving the linear systems used by the reciprocal models.

At block 1206, in at least one of the various embodiments, resources may be allocated to the pass-through objects. In at least one of the various embodiments, the specific amount of resources allocated for the pass-through objects may be computed by determining an effective resource price by dividing the effective resource value for each pass-through object by the number of resource units provided by that pass-through object.

At block 1208, in at least one of the various embodiments, resources may be allocated to the priced objects and final objects. In at least one of the various embodiments, a reciprocal modeling engine, such as, reciprocal modeling engine 324 may be arranged to sum the following:

Any direct resource allocations (allocations where the provider object and the consumer object are both object J).

Any resources services allocated to object J (computed via the P*Q method, by multiplying the quantity of units allocated to consumer object J with the price-per-unit of the provider (if the provider is a priced object) or with the effective price per unit that was provided previously, if the provider object is a pass-through object.

Any source object resources allocated to object J from one or more source objects providers.

At block 1210, in at least one of the various embodiments, the resource allocation information generated using the reciprocal model may be provided to the data model. Next, control may be returned to a calling process.

Figure 13:
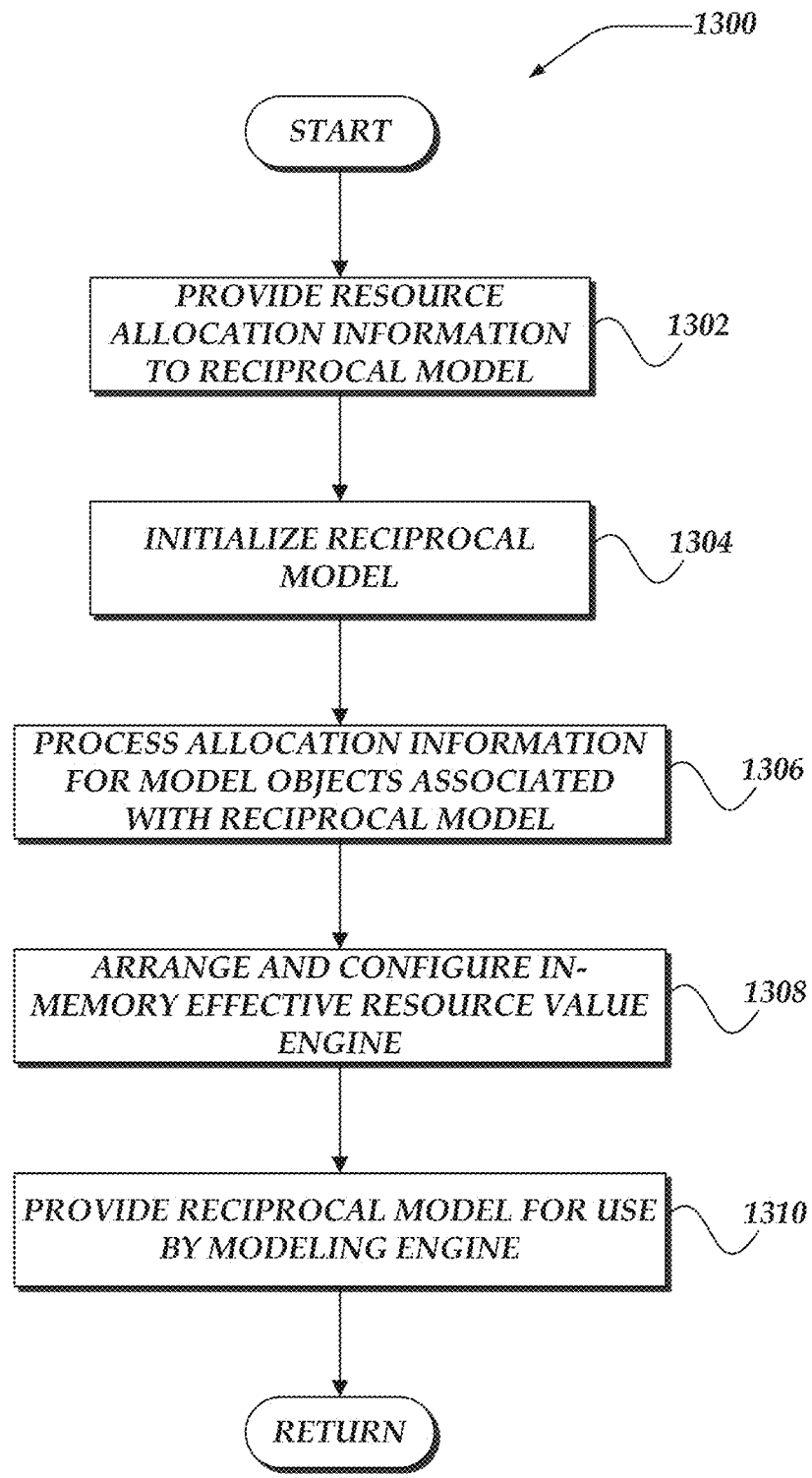
FIG. 13 illustrates an overview flow chart for a process for providing and employing reciprocal allocation models in accordance with at least one of the various embodiments.

FIG. 13 illustrates an overview flow chart for process 1300 for providing and employing reciprocal allocation models in accordance with at least one of the various embodiments. After a start block, at block 1302, in at least one of the various embodiments, resource allocation information associated with the reciprocal model may be provided to a resource modeling engine, such as, resource modeling engine 324. In at least one of the various embodiments, the allocation information may include allocation information associated with the one or more model object that may be included in a data model or data model portion that the reciprocal model is based on. For example, list 900 in FIG. 9A represents a list or array of allocation information derived from data model 800. At block 1304, in at least one of the various embodiments, the reciprocal model may be initialized. In at least one of the various embodiments, various data structures including one or more matrices, one or more vectors, or the like may be initialized. Accordingly, in at least one of the various embodiments, memory of a computer may be configured and arranged to store data structures in-memory to provide efficient processing. At block 1306, in at least one of the various embodiments, allocation information for the model objects associated with the reciprocal model may be processed. In at least one of the various embodiments, the resource modeling engine may be arranged employ the allocation information and the data structures to perform operations to provide information and structure for the reciprocal data model. At block 1308, in at least one of the various embodiments, an effective resource value engine may be arranged and configured by the resource modeling engine. At block 1310, in at least one of the various embodiments, the reciprocal model may be made available for use by a modeling engine, such as, modeling engine 322. Next, control may be returned to a calling process.

Figure 14:
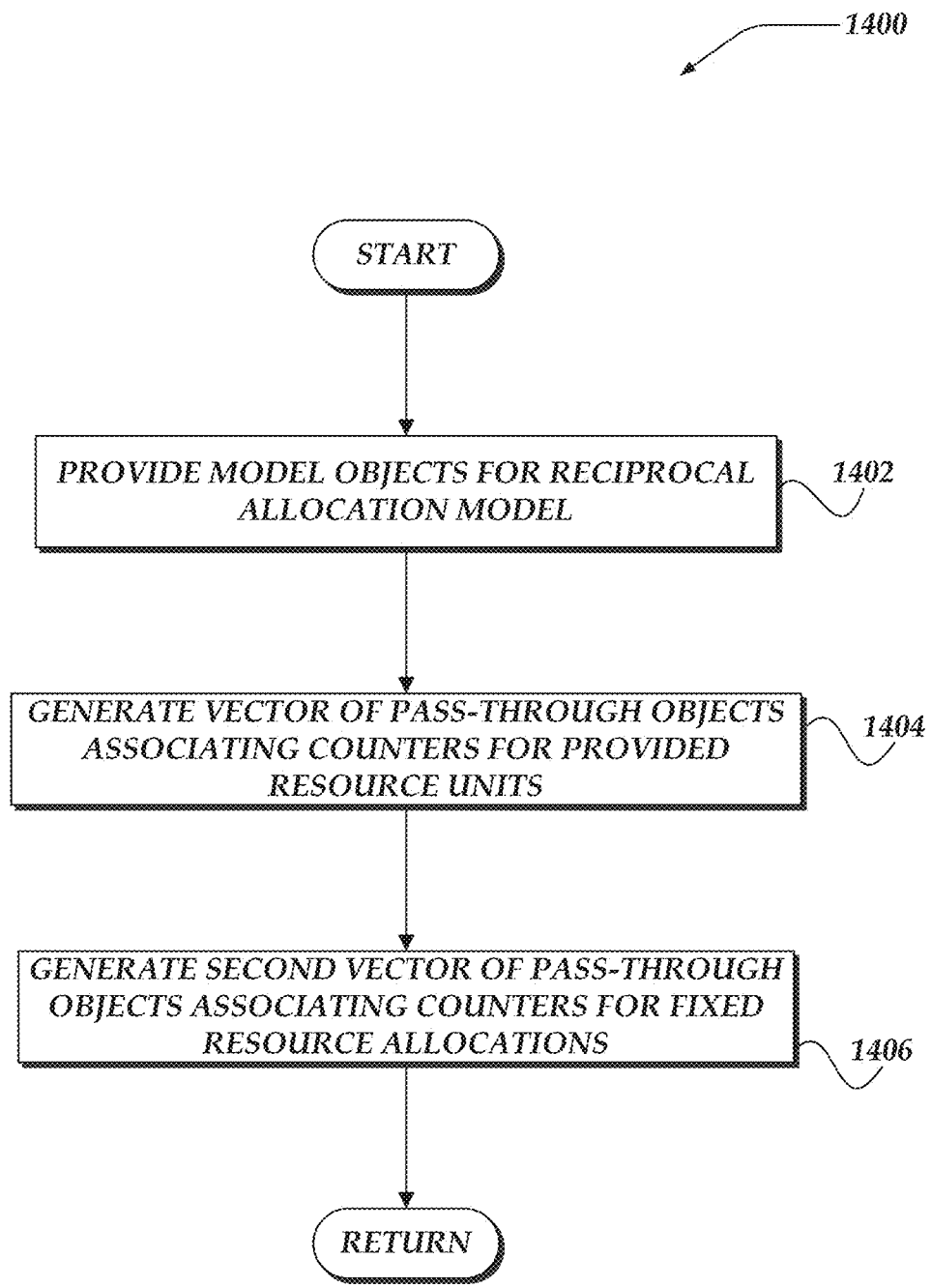
FIG. 14 illustrates a flowchart for a process for initializing reciprocal allocation models in accordance with at least one of the various embodiments.

FIG. 14 illustrates a flowchart for process 1400 for initializing reciprocal allocation models in accordance with at least one of the various embodiments. After a start block, at block 1402, in at least one of the various embodiments, one or model object from a data model may be provided for the reciprocal allocation model. As described above, the model objects may be from one or more portions of a larger data model. For example, for embodiments, the model objects described for data model 800 may be selected (e.g., partitioned) from a larger parent data model.

At block 1404, in at least one of the various embodiments, a vector of pass-through objects associating counters for provided resource units may be provided. In at least one of the various embodiments, the resource modeling engine may be arranged to generate a vector data structure arranged have a slot for each pass-through object (See, vector 902 in FIG. 9B). In at least one of the various embodiments, the resource modeling engine may be arranged to initialize the resource unit values for each entry in the vector to zero.

At block 1406, in at least one of the various embodiments, the resource modeling engine may be arranged to generate a second vector of pass-through objects associating counters for fixed resource allocations. In at least one of the various embodiments, the resource modeling engine may be arranged to initialize the resource unit values for each entry in the vector to zero. (See, vector 904 in FIG. 9C.) Next, control may be returned to a calling process.

Figure 15:
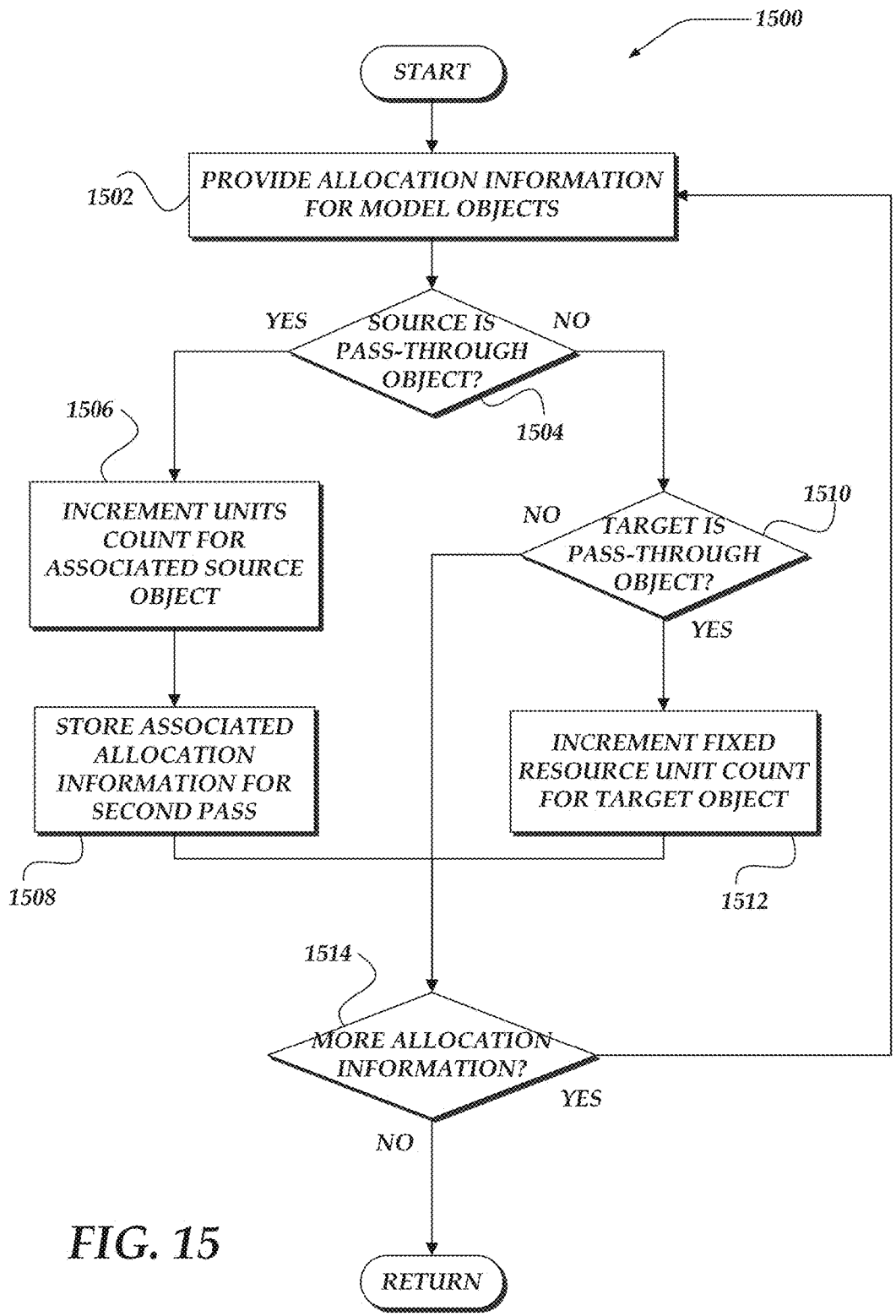
FIG. 15 illustrates a flowchart for a process for generating a reciprocal allocation models in accordance with at least one of the various embodiments.

FIG. 15 illustrates a flowchart for process 1500 for generating a reciprocal allocation models in accordance with at least one of the various embodiments. After a start block, at block 1502, in at least one of the various embodiments, a resource modeling engine, such as, resource modeling engine 324, may be arranged to provide allocation information for the model objects that may be associated with the reciprocal model being generated.

At decision block 1504, in at least one of the various embodiments, if the source object is a pass-through object, control may be flow to block 1506; otherwise, control may flow to decision block 1510. In at least one of the various embodiments, the allocation information may include information similar to a row in the list 900 shown in FIG. 9A. Accordingly, in some embodiments, if the allocation information describes a pass-through object allocating resources to another model object, such as in the second row of list 900 in FIG. 9A, control may advance to block 1506.

At block 1506, in at least one of the various embodiments, the resource unit count for the pass-through object may be incremented based on the allocation information. In at least one of the various embodiments, this information may be stored in vector 902 as shown in FIG. 9B. For example, in at least one of the various embodiments, using the second row list 900 of FIG. 9A, the vector element corresponding to email object 804 may be incremented by 10. For this example, this reflects that email object 804 provides ten email accounts to call center object 802.

At block 1508, in at least one of the various embodiments, the allocation information associated with the vector update performed at block 1506 may be stored for use in a second pass operations. Next, control may flow to decision block 1514.

At block 1510, in at least one of the various embodiments, if the allocation information indicates that the target of the allocation is a pass-through object, control may flow to block 1512; otherwise, control may flow to decision block 1514.

At block 1512, in at least one of the various embodiments, a vector element in the fixed resource value vector that corresponds to the targeted pass-through object may be incremented by the amount indication in the allocation information. For example, referring to last line of list 900 of FIG. 9A, and data model 800, call center object 802, a pass-through object, is the target/recipient of $5000 allocated from department object 808. Next, control may flow to decision block 1514.

At decision block 1514, in at least one of the various embodiments, if more allocation information needs processing, control may loop back to block 1502; otherwise, control may be returned to a calling process. In at least one of the various embodiments, the allocation information may be provided as one or more records describing how resources are allocated in data model. Accordingly, in at least one of the various embodiments, if each allocation information record is processed, control may be returned to a calling process.

Figure 16:
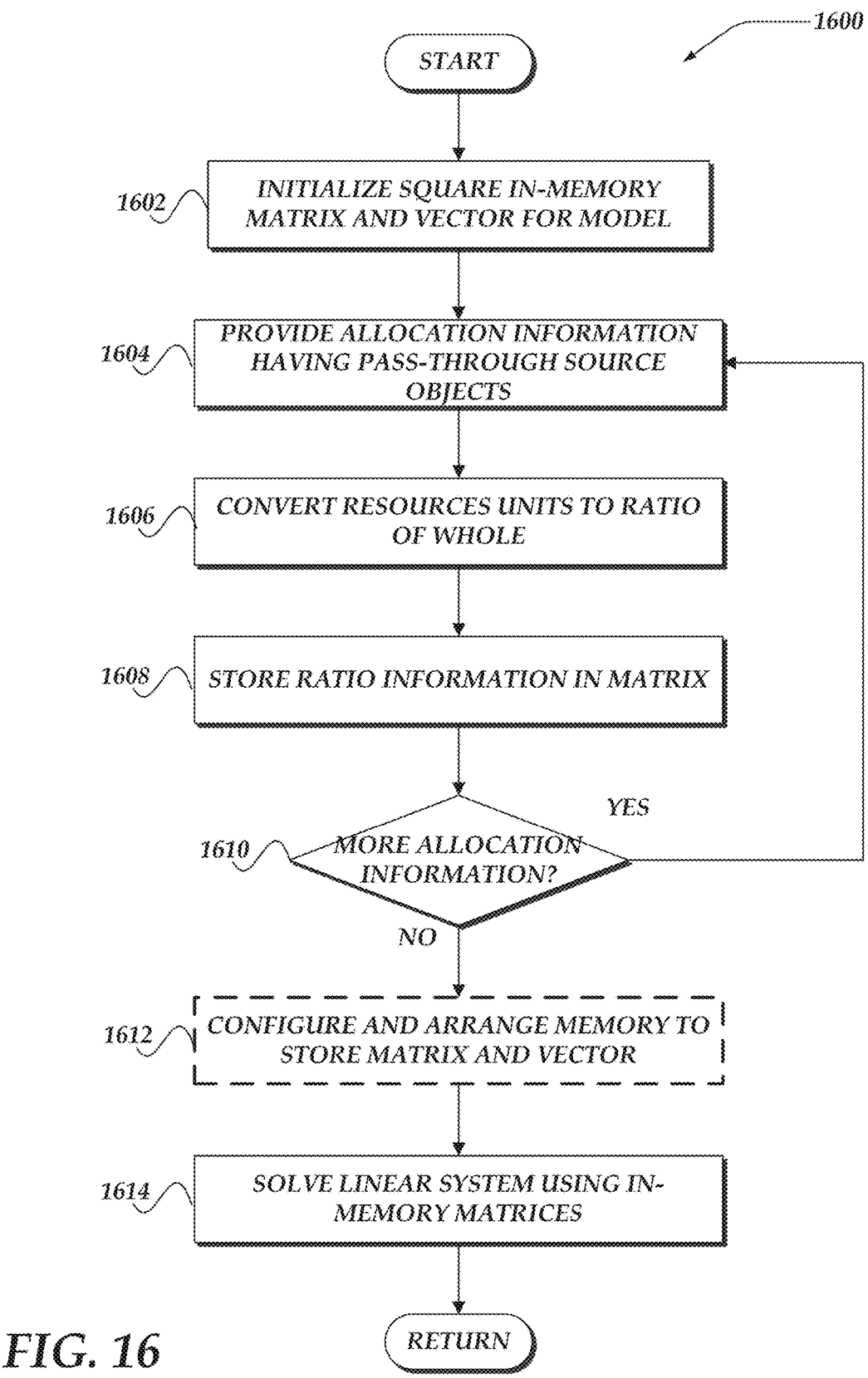
FIG. 16 illustrates a flowchart for a process for generating a reciprocal allocation models in accordance with at least one of the various embodiments.

FIG. 16 illustrates a flowchart for process 1600 for generating a reciprocal allocation models in accordance with at least one of the various embodiments. In at least one of the various embodiments, if the counters are computed, a second pass over the allocations may be performed in order to: convert the unit allocations to percentages; and represent the percentage directly into the matrix A*x+B format. After a start block, at block 1602, in at least one of the various embodiments, one or more square matrix may be initialized. Also, one or more vectors may be initialized. Accordingly, in at least one of the various embodiments, the resource modeling engine may configure and arrange memory (e.g., non-transitory computer readable/writable media) to instantiate and initialize data structures for the matrices.

In at least one of the various embodiments, a matrix may be initialized as an identity matrix containing ones on the main diagonal; where negative ratio values may be added as the process progresses. To efficiently load the transactions into the matrix in a single step, the reciprocal modeling engine may be arranged to perform one or more the following operations. In some embodiments, square in-memory matrix may be initialized, containing as many rows (and columns) as the number of pass-through objects associated with the reciprocal model. In at least one of the various embodiments, the matrix may be initialized to 0, except for the main diagonal, which may be initialized to 1. Also, a vector of having the number of elements and the number of elements in the matrix's row may be initialized with each element set to 0. For example, for some embodiments, FIG. 9D shows matrix 906, a matrix A, and vector 908, a vector B, initialized for generating a reciprocal model for data model 800.

At block 1604, in at least one of the various embodiments, allocation information where pass-through objects are the source object may be provided. As discussed above the allocation information may be in form of records identified and stored by process 1500 at block 1508.

At block 1606, in at least one of the various embodiments, the resource units represented by the allocation information may be converted in a ratio of the total resource units provided for the pass-through object. In some embodiments, the number of units may be converted to a percentage, by dividing it by the total units allocated from the source. For example, referring to the second row in list 900 of FIG. 9A, the source is email, the ratio is 10/160=0.0625.

At block 1608, in at least one of the various embodiments, the provided ratio value may be stored in the A matrix in a position that corresponds to the source object and the target object. In at least one of the various embodiments, the percentage is subtracted from the matrix cell corresponding, on columns, to the source object and, on rows, to the destination object. As, in this example, assuming that Email is the first object, the column will be 1. And, assuming that the Call Center is the second object, the row will be 2. Accordingly, the new value of the cell at row 2, column 1 in matrix A becomes 0−10/160=−0.0625. At decision block 1610, in at least one of the various embodiments, if there is more allocation information to process, control may loop back to block 1604; otherwise, control may flow to block 1612. Accordingly, in at least one of the various embodiments, if the allocation information for the reciprocal model is processed, the matrix will contain information based on the allocation information and the vector may contain values of fixed recourse values. For example, matrix 910 and vector 912 shown in FIG. 9E may be produced for data model 800.

At block 1612, in at least one of the various embodiments, optionally, memory of the network computer executing the reciprocal modeling engine may be configured and arranged to store the matrix A data structure (e.g., matrix 910) and vector B data structure (e.g., vector 912). In at least one of the various embodiments, the matrix and vector values may be packed into contiguous memory and arranged to be compatible with one or more well-known linear system solvers or one or more customer linear system solvers.

In at least one of the various embodiments, the cells for the matrix A (e.g., matrix 910) may be packed into contiguous memory followed in order by the values for the elements of the vector B (e.g., vector 912). Packing the values in a contiguous block of memory enables the reciprocal modeling engine to provide reallocated heap or stack memory to the linear system solver. Also, in some embodiments, providing the values for matrix A and vector B in contiguous memory enables the one or more processors executing the linear system solver to efficiently iterated over the values by incrementing address pointer(s) rather than having to fetch the values from disparate areas in the memory address space. Further, using contiguous memory may improve performance of the one or more processes by reducing L1/L2/L3 cache misses during the solving of the linear systems used computing the effective resources cots of the pass-through objects. Likewise, in some embodiments, for larger matrices and vectors, the one or more processors may efficiently slice or partition the contiguous memory to facilitate concurrent processing.

For example, for embodiments, FIG. 9F shows non-transitory computer readable media 914 (e.g., memory) arranged to store in contiguous memory matrix 910, a matrix A, and vector 912, a vector B, for a reciprocal model based on data model 800. Alternatively, as discussed above, media 916 shows another memory arrangement for storing in contiguous memory matrix 910, a matrix A, and vector 912, a vector B, for a reciprocal model based on data model 800.

This block is labeled optional because in one or more embodiments the memory of the network computer executing the reciprocal modeling engine may be configured and arrange to store the matrix A data structure and vector B data structure during the execution of one or more of the above blocks.

At block 1614, in at least one of the various embodiments, the reciprocal modeling engine may be arranged to solve the linear system defined by A*x+B using the in-memory matrices. Accordingly, in some embodiments, the matrix may be populated with the linear systems coefficients solved using a linear system engine that provides the effective resource values for the pass-through objects. In at least one of the various embodiments, the solved resource allocations for the pass-through object may be provided to the parent data model.

In at least one of the various embodiments, the linear system engine may be arranged to employ one or more numerical processing software libraries, such as, NumPy, LAPACK, Intel Math Kernel Library (Intel MKL), GNU Scientific Library, or the like, for solving the linear systems used by the reciprocal models. Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A method for managing resource allocation, over a network, using a network computer that includes one or more processors, wherein each step of the method is performed by the one or more processors, comprising:
    instantiating a resource modeling engine to perform actions, including:
        providing, by the one or more processors, a partitioned portion of a data model comprised of two or more nodes and one or more edges from the data model that is stored in a memory of the network computer, wherein the memory is configured and arranged to store the data model, and wherein each node represents a model object and each edge represents a resource allocation for one or more different types of resources;
        providing, by the one or more processors, allocation information based on each resource allocation that is associated with one or more pass-through objects that are included in the data model portion, wherein the allocation information includes a count of resource units allocated by the one or more pass-through objects and a count of fixed resource units allocated to the one or more pass-through objects, and wherein a pass-through object models an intermediate cost to provide a unit of service based on a cost of one or more resources that are employed to provide a service instead of using a fixed cost to provide the unit of service; and
        providing, by the one or more processors, a memory buffer that is arranged and configured to contiguously store, in one or more blocks of memory, allocation ratio information adjacent to fixed resource information that is based on the allocation information, wherein the one or more blocks of memory is partitioned to provide concurrent processing of the allocation ratio information and the fixed resource information; and
    instantiating a reciprocal modeling engine to perform actions, including:
        providing, by the one or more processors, a reciprocal model that is based on the data model portion and the memory buffer that includes the allocation ratio information and the fixed resource information, wherein the reciprocal model is associated with the data model portion;
        initializing, by the one or more processors, the reciprocal model by generating a first vector data structure and a second vector data structure for tracking allocations to each pass-through object included with the reciprocal model, wherein the first vector data structure includes a slot for tracking each pass-through object and the second vector data structure includes a counter for tracking each fixed resource allocation that is associated with each of the pass-through objects included with the reciprocal model;
        using requested resource information for a pass-through object that is associated with the reciprocal model, by the one or more processors, to employ the reciprocal model to provide the requested resource information to the data model portion; and
        providing a visual representation of the data model portion for a display, wherein geolocation information from a Global Positioning System (GPS) device is employed to modify the visual display of the data model portion based on determined geolocation information for a user, and wherein modifications to the visual display include one or more of a time zone, a currency, a calendar format, or a language.

2. The method of claim 1, wherein providing the reciprocal model, further comprises, providing an effective resource engine based on solving a linear system corresponding to the allocation ratio information and the fixed resource information.

3. The method of claim 1, wherein providing the allocation information, further comprises:
    when a resource allocation includes a pass-through object that is a source object, incrementing a count of resource units allocated to the pass-through object that is the source object; and
    when the resource allocation includes a pass-through object that is a target object, incrementing a count of fixed resource value units allocated to the pass-through object that is the target object.

4. The method of claim 1, further comprising, providing, by the one or more processors, one or more other reciprocal models that correspond to one or more other portions of the data model.

5. The method of claim 1, wherein providing the allocation ratio information further comprises:
    storing the allocation ratio information in a matrix data structure; and
    storing the fixed resource information in a vector data structure.

6. The method of claim 1, further comprising, traversing, by the one or more processors, the data model to provide one or more other portions of the data model, wherein the one or more other data model portions each include at least one pass-through object.

7. The method of claim 1, further comprising, providing, by the one or more processors, a visualization that displays the data model, wherein the reciprocal model is concealed from a user of the visualization.

8. A system for managing resource allocations over a network, comprising:
    a network computer, comprising:
        a memory that stores at least instructions; and
        one or more processor devices that execute instructions that perform actions, including:
            instantiating a resource modeling engine to perform actions, including:
                providing, by the one or more processors, a partitioned portion of a data model comprised of two or more nodes and one or more edges from the data model that is stored in a memory of the network computer, wherein the memory is configured and arranged to store the data model, and wherein each node represents a model object and each edge represents a resource allocation for one or more different types of resources;
                providing, by the one or more processors, allocation information based on each resource allocation that is associated with one or more pass-through objects that are included in the data model portion, wherein the allocation information includes a count of resource units allocated by the one or more pass-through objects and a count of fixed resource units allocated to the one or more pass-through objects, and wherein a pass-through object models an intermediate cost to provide a unit of service based on a cost of one or more resources that are employed to provide a service instead of using a fixed cost to provide the unit of service; and providing, by the one or more processors, a memory buffer that is arranged and configured to contiguously store, in one or more blocks of memory, allocation ratio information adjacent to fixed resource information that is based on the allocation information, wherein the one or more blocks of memory is partitioned to provide concurrent processing of the allocation ratio information and the fixed resource information; and instantiating a reciprocal modeling engine to perform actions, including:

providing, by the one or more processors, a reciprocal model that is based on the data model portion and the memory buffer that includes the allocation ratio information and the fixed resource information, wherein the reciprocal model is associated with the data model portion;

initializing, by the one or more processors, the reciprocal model by generating a first vector data structure and a second vector data structure for tracking allocations to each pass-through object included with the reciprocal model, wherein the first vector data structure includes a slot for tracking each pass-through object and the second vector data structure includes a counter for tracking each fixed resource allocation that is associated with each of the pass-through objects included with the reciprocal model; and using requested resource information for a pass-through object that is associated with the reciprocal model, by the one or more processors, to employ the reciprocal model to provide the requested resource information to the data model portion; and a client computer, comprising:

a client computer memory that stores at least instructions; and one or more processor devices that execute instructions that perform actions, including:

providing a request for resource information; and displaying one or more visualization of the requested resource information, wherein geolocation information from a Global Positioning System (GPS) device is employed to modify the visualization in a display of the data model portion based on determined geolocation information for a user, and wherein modifications to the visual display include one or more of a time zone, a currency, a calendar format, or a language.

9. The system of claim 8, wherein providing the reciprocal model, further comprises, providing an effective resource engine based on solving a linear system corresponding to the allocation ratio information and the fixed resource information.

10. The system of claim 8, wherein providing the allocation information, further comprises:

when a resource allocation includes a pass-through object that is a source object, incrementing a count of resource units allocated to the pass-through object that is the source object; and when the resource allocation includes a pass-through object that is a target object, incrementing a count of fixed resource value units allocated to the pass-through object that is the target object.

11. The system of claim 8, wherein the one or more network computer processor devices execute instructions that perform actions, further comprising, providing, by the one or more processors, one or more other reciprocal models that correspond to one or more other portions of the data model.

12. The system of claim 8, wherein providing the allocation ratio information further comprises:

storing the allocation ratio information in a matrix data structure; and storing the fixed resource information in a vector data structure.

13. The system of claim 8, wherein the one or more network computer processor devices execute instructions that perform actions, further comprising, traversing, by the one or more processors, the data model to provide one or more other portions of the data model, wherein the one or more other data model portions each include at least one pass-through object.

14. The system of claim 8, wherein the one or more network computer processor devices execute instructions that perform actions, further comprising, providing, by the one or more processors, a visualization that displays the data model, wherein the reciprocal model is concealed from a user of the visualization.

15. A processor readable non-transitory storage media that includes instructions for managing resource allocations over a network, wherein execution of the instructions by one or more hardware processors performs actions, comprising:

instantiating a resource modeling engine to perform actions, including:

providing, by the one or more processors, a partitioned portion of a data model comprised of two or more nodes and one or more edges from the data model that is stored in a memory of the network computer, wherein the memory is configured and arranged to store the data model, and wherein each node represents a model object and each edge represents a resource allocation for one or more different types of resources;

providing, by the one or more processors, allocation information based on each resource allocation that is associated with one or more pass-through objects that are included in the data model portion, wherein the allocation information includes a count of resource units allocated by the one or more pass-through objects and a count of fixed resource units allocated to the one or more pass-through objects, and wherein a pass-through object models an intermediate cost to provide a unit of service based on a cost of one or more resources that are employed to provide a service instead of using a fixed cost to provide the unit of service; and providing, by the one or more processors, a memory buffer that is arranged and configured to contiguously store, in one or more blocks of memory, allocation ratio information adjacent to fixed resource information that is based on the allocation information, wherein the one or more blocks of memory is partitioned to provide concurrent processing of the allocation ratio information and the fixed resource information; and instantiating a reciprocal modeling engine to perform actions, including:

providing, by the one or more processors, a reciprocal model that is based on the data model portion and the memory buffer that includes the allocation ratio information and the fixed resource information, wherein the reciprocal model is associated with the data model portion;

initializing, by the one or more processors, the reciprocal model by generating a first vector data structure and a second vector data structure for tracking allocations to each pass-through object included with the reciprocal model, wherein the first vector data structure includes a slot for tracking each pass-through object and the second vector data structure includes a counter for tracking each fixed resource allocation that is associated with each of the pass-through objects included with the reciprocal model;

using requested resource information for a pass-through object that is associated with the reciprocal model, by the one or more processors, to employ the reciprocal model to provide the requested resource information to the data model portion; and providing a visual representation of the data model portion for a display, wherein geolocation information from a Global Positioning System (GPS) device is employed to modify the visual display of the data model portion based on determined geolocation information for a user, and wherein modifications to the visual display include one or more of a time zone, a currency, a calendar format, or a language.

16. The media of claim 15, wherein providing the reciprocal model, further comprises, providing an effective resource engine based on solving a linear system corresponding to the allocation ratio information and the fixed resource information.

17. The media of claim 15, wherein providing the allocation information, further comprises:
when a resource allocation includes a pass-through object that is a source object, incrementing a count of resource units allocated to the pass-through object that is the source object; and
when the resource allocation includes a pass-through object that is a target object, incrementing a count of fixed resource value units allocated to the pass-through object that is the target object.

18. The media of claim 15, further comprising, providing, by the one or more processors, one or more other reciprocal models that correspond to one or more other portions of the data model.

19. The media of claim 15, wherein providing the allocation ratio information further comprises:
storing the allocation ratio information in a matrix data structure; and
storing the fixed resource information in a vector data structure.

20. The media of claim 15, further comprising, traversing, by the one or more processors, the data model to provide one or more other portions of the data model, wherein the one or more other data model portions each include at least one pass-through object.

21. A network computer for managing resource allocations over a network, comprising:
a memory that stores at least instructions; and
one or more processor devices that execute instructions that perform actions, including:
instantiating a resource modeling engine to perform actions, including:
providing, by the one or more processors, a partitioned portion of a data model comprised of two or more nodes and one or more edges from the data model that is stored in a memory of the network computer, wherein the memory is configured and arranged to store the data model, and wherein each node represents a model object and each edge represents a resource allocation for one or more different types of resources;
providing, by the one or more processors, allocation information based on each resource allocation that is associated with one or more pass-through objects that are included in the data model portion, wherein the allocation information includes a count of resource units allocated by the one or more pass-through objects and a count of fixed resource units allocated to the one or more pass-through objects, and wherein a pass-through object models an intermediate cost to provide a unit of service based on a cost of one or more resources that are employed to provide a service instead of using a fixed cost to provide the unit of service; and
providing, by the one or more processors, a memory buffer that is arranged and configured to contiguously store, in one or more blocks of memory, allocation ratio information adjacent to fixed resource information that is based on the allocation information, wherein the one or more blocks of memory is partitioned to provide concurrent processing of the allocation ratio information and the fixed resource information; and
instantiating a reciprocal modeling engine to perform actions, including:
providing, by the one or more processors, a reciprocal model that is based on the data model portion and the memory buffer that includes the allocation ratio information and the fixed resource information, wherein the reciprocal model is associated with the data model portion;
initializing, by the one or more processors, the reciprocal model by generating a first vector data structure and a second vector data structure for tracking allocations to each pass-through object included with the reciprocal model, wherein the first vector data structure includes a slot for tracking each pass-through object and the second vector data structure includes a counter for tracking each fixed resource allocation that is associated with each of the pass-through objects included with the reciprocal model;
using requested resource information for a pass-through object that is associated with the reciprocal model, by the one or more processors, to employ the reciprocal model to provide the requested resource information to the data model portion; and
providing a visual representation of the data model portion for a display, wherein geolocation information from a Global Positioning System (GPS) device is employed to modify the visual display of the data model portion based on determined geolocation information for a user, and wherein modifications to the visual display include one or more of a time zone, a currency, a calendar format, or a language.

22. The network computer of claim 21, wherein providing the reciprocal model, further comprises, providing an effective resource engine based on solving a linear system corresponding to the allocation ratio information and the fixed resource information.

23. The network computer of claim 21, wherein providing the allocation information, further comprises:
   when a resource allocation includes a pass-through object that is a source object, incrementing a count of resource units allocated to the pass-through object that is the source object; and
   when the resource allocation includes a pass-through object that is a target object, incrementing a count of fixed resource value units allocated to the pass-through object that is the target object.

24. The network computer of claim 21, wherein providing the allocation ratio information further comprises:
   storing the allocation ratio information in a matrix data structure; and
   storing the fixed resource information in a vector data structure.

25. The network computer of claim 21, further comprising, traversing, by the one or more processors, the data model to provide one or more other portions of the data model, wherein the one or more other data model portions each include at least one pass-through object.

26. The network computer of claim 21, further comprising, providing, by the one or more processors, a visualization that displays the data model, wherein the reciprocal model is concealed from a user of the visualization.

* * * * *